(12) United States Patent
Khisti et al.

(10) Patent No.: US 7,239,611 B2
(45) Date of Patent: Jul. 3, 2007

(54) CONTROLLING ADMISSION OF DATA STREAMS ONTO A NETWORK BASED ON END-TO-END MEASUREMENTS

(75) Inventors: Ashish Khisti, Cambridge, MA (US); Christian Huitema, Clyde Hill, WA (US); Aditya Dube, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 10/378,532

(22) Filed: Mar. 3, 2003

(65) Prior Publication Data

US 2004/0174815 A1 Sep. 9, 2004

(51) Int. Cl.
*H04J 1/16* (2006.01)
*H04J 3/14* (2006.01)

(52) U.S. Cl. .................. 370/230; 370/235; 370/231
(58) Field of Classification Search ............... 370/229, 370/230, 231, 235, 395.1, 396, 395.2, 395.4, 370/395.41, 468
See application file for complete search history.

(56) References Cited

U.S. PATENT DOCUMENTS

| | | | | |
|---|---|---|---|---|
| 5,488,609 | A | 1/1996 | Hluchyj et al. | 370/84 |
| 5,745,694 | A | 4/1998 | Egawa et al. | 395/200.55 |
| 6,075,769 | A | 6/2000 | Ghanwani et al. | 370/229 |
| 6,222,824 | B1 | 4/2001 | Marin et al. | 370/230 |
| 6,292,466 | B1 | 9/2001 | Droz | 370/232 |
| 6,430,160 | B1 | 8/2002 | Smith et al. | 370/252 |
| 6,480,509 | B1 | 11/2002 | Grutter | 370/477 |
| 6,498,782 | B1 | 12/2002 | Branstad et al. | 370/231 |
| 6,917,590 | B1 * | 7/2005 | Oliva | 370/232 |
| 7,130,268 | B2 * | 10/2006 | Mascolo | 370/232 |
| 2002/0034162 | A1 * | 3/2002 | Brinkerhoff et al. | 370/229 |

(Continued)

FOREIGN PATENT DOCUMENTS

EP 0697778 A2 2/1996

(Continued)

OTHER PUBLICATIONS

19th Conference on Local Computer Networks; Oct. 2-5, 1994, Minneapolis, Minnesota; IEEE Computer Society; "The Ethernet Capture Effect: Analysis and Solution", K.K. Ramakrishnan and Henry Yang pp. 228-240.

(Continued)

*Primary Examiner*—Ajit Patel
(74) *Attorney, Agent, or Firm*—Workman Nydegger

(57) ABSTRACT

Appropriate determinations in a series of tests, which transition from more passive tests to more active tests, control the admission of data streams onto a network data path. More passive tests can include promiscuous mode and packet-pair tests. When the results of more passive tests indicate a reduce likelihood of a data stream causing a network data path to transition into a congested state, the network data path can be actively probed to make a more precise determination on the likelihood of congestion. A train of diagnostic data packets is transmitted at a diagnostic data transfer rate having a significantly reduced chance of causing congestion. A train of target data packets is transmitted at a requested application transfer data rate. The number of target data packets received within a specified delay threshold is compared to the number of diagnostic data packets receive with the delay threshold.

36 Claims, 7 Drawing Sheets

U.S. PATENT DOCUMENTS

| | | | |
|---|---|---|---|
| 2002/0183039 A1 | 12/2002 | Padgett et al | 455/406 |
| 2002/0186660 A1 | 12/2002 | Bahadiroglu | 370/248 |
| 2003/0016630 A1 | 1/2003 | Vega-Garcia | 370/252 |
| 2003/0067872 A1* | 4/2003 | Harrell et al. | 370/229 |
| 2006/0227706 A1* | 10/2006 | Burst, Jr. | 370/229 |

FOREIGN PATENT DOCUMENTS

| | | |
|---|---|---|
| EP | 0827307 A2 | 4/1998 |
| EP | 0920236 A2 | 6/1999 |
| EP | 1026855 A2 | 9/2000 |
| WO | WO 00/56021 | 9/2000 |
| WO | WO 01/20918 | 3/2001 |
| WO | WO 02/19654 | 3/2002 |

OTHER PUBLICATIONS

"A New End-to-End Probing and Analysis Method for Estimating Bandwidth Bottlenecks"; Bob Melander, Mats Bjorkman, Per Gunningberg; 19th Conference on Local Computer Networks (Oct. 1994) pp. 415-420.

"Real-Time Systems Symposium", San Juan, Puerto Rico, Dec. 7-9, 1994; IEEE Computer Society Press "Supporting Real-Time Traffic on Ethernet", Chitra Venkatramani, Tzi-cker Chiueh, pp. 282-286.

Computer Communication Review, vol. 30, No. 4, Oct. 2000 "Measuring Link Bandwidths Using a Deterministic Model of Packet Delay", Kevin Lai, Mary Baker, pp. 283-294.

"Long Distance Visibility of the Ethernet Capture Effect", Bob Melander, Mats Bjorkman and Per Gunningberg Dept. of Computer Systems, Uppsala University Proceedings, PAM 2002.

"Efficient and Accurate Ethernet Simulation", Jia Wang and Srinivasan Keshav Cornell Network Research Group, Dept. of Computer Science, Cornell University pp. 182-191 24th Conference on Local Computer Networks, Oct. 1999.

Yuan, Ping, et al., "Design and Implementation of Scalable Edge-Based Admission Control" Computer Networks 37, pp. 507-518, 2001.

* cited by examiner

CONTROLLING ADMISSION OF DATA STREAMS ONTO A NETWORK BASED ON END-TO-END MEASUREMENTS

BACKGROUND OF THE INVENTION

1. The Field of the Invention

The present invention relates to network communication technology, and more specifically, to mechanisms for controlling the admission of data streams onto a network.

2. Background and Relevant Art

Computer networks have enhanced our ability to communicate and access information by allowing one computer or device (hereinafter both referred to as a "computing system") to communicate over a network with another computing system using electronic data. When transferring electronic data between computing systems, the electronic message will often pass through a protocol stack that performs operations on the electronic data. The Open System Interconnect ("OSI") model is an example of a networking framework for implementing a protocol stack.

The OSI model breaks down the operations for transferring electronic data into seven distinct "layers," each designated to perform certain operations in the data transfer process. While protocol stacks can potentially implement each of the layers, many protocol stacks implement only selective layers for use in transferring electronic data across a network. When electronic data is transmitted from a computing system, it originates at the application layer and is passed down to intermediate lower layers and then onto a network. When electronic data is received from a network it enters the physical layer and is passed up to higher intermediate layers and then eventually received at the application layer.

The application layer, the upper most layer, is responsible for supporting applications and end-user processes. An intermediate layer incorporated by most protocol stacks is the transport layer, which at the very least functions to multiplex application data into transport layer segments for delivery to lower layers and to demultiplex transport layer segments into application data for delivery to applications. The User Datagram Protocol ("UDP") is an example of a protocol implemented at the transport layer that does little more than multiplex/demultiplex data for compatible transfer between applications and networks. Another common protocol implemented at the transport layer is the Transmission Control Protocol ("TCP"), a connection-oriented protocol that can also provide the features of end-to-end error recovery, resequencing, and flow control to the application layer.

Even on properly configured networks data loss can occur from time to time due to adverse network conditions, such as, for example, hardware component failures, software errors, link noise or interference, network congestion, etc. In may instances, the occurrence of adverse network conditions will be unknown to an user desiring to transmit electronic data across a network. Further, even if the user becomes aware of adverse network conditions, correcting the adverse conditions is often beyond the user's control. Thus, there is always some potential for data loss when electronic data is transferred across a network. Fortunately, the features of TCP can compensate for and correct data loss resulting from many adverse network conditions. Accordingly, TCP is extremely useful when reliable transfer of data is desired, such as, for example, when transferring a Web page with both text and graphics.

However, to realize the features of TCP, certain state information, such as, for example, receive and send buffers, congestion control parameters, and sequence and acknowledgment number parameters must be maintained for each TCP connection. Maintenance of state information consumes computing system resources (e.g., system memory) making these resources unavailable to user processes that might otherwise utilize the resources. Thus, when reliable transfer of data is not critical, applications may instead use UDP to conserve computing system resources when transmitting electronic data across a network.

UDP is particularly well suited for transferring audio and video data (hereinafter referred to as "A/V data") as a steady and continuous stream (frequently referred to as "streaming") between computing systems. Since output of A/V data typically includes refreshing previously received A/V data, some loss of A/V data (e.g., such as the inherent data loss in many networks) from an A/V data stream is not critical. For example, when video data for a video frame is not received, a display screen may appear to momentarily flicker but is then refreshed when updated video data is received. Accordingly, UDP is frequently used to transfer A/V data streams between computing systems in Home Network, Local Area Network, and Wide Area Network environments.

Unfortunately, UDP has no built in mechanism for congestion control. Thus, a computing system utilizing UDP to transmit an A/V data stream typically cannot detect when transmission of the A/V data stream is being degraded due to network congestion. Likewise, a computing system utilizing UDP to transmit an A/V data stream typically cannot detect when the A/V data stream is causing network congestion that degrades other A/V data streams. Thus, it may be that an A/V data stream is transmitted onto a network with other existing AN data streams thereby degrading the quality of all the AN data streams.

For example, when a 10 Mega-bit per second ("Mbps") Ethernet Hub is supporting an existing 6 Mbps High Definition Television data stream and another 6 Mbps High Definition Television data stream is initiated, both data streams may suffer from high delay, jitter, and packet loss. Further, since the transmission speed of UDP is only constrained by the rate at which an application generates data and the capabilities of the source (CPU, clock rate, etc.), it would not be uncommon to have a number A/V data streams transmitting data at high data transfer rates at any given time. Although, TCP has a congestion control mechanism, the TCP congestion control mechanism is not well suited for real-time applications, such as, for example, those applications that transmit A/V data streams. The TCP congestion control mechanism reduces the data transfer rate when one or more data links between a sending computing system and a receiver computing system become excessively congested. However, reduction of a data transfer rate can significantly degrade real-time applications, which can tolerate some packet loss but require a minimum data transfer rate.

Additionally, when a network becomes congested, one A/V data stream may get a disproportionate amount of bandwidth (commonly referred to as the "Ethernet Capture Effect"). Thus, a newer A/V data stream could possibly "take-over" bandwidth from an existing A/V data stream. This may leave an existing user of the existing A/V data stream dissatisfied. An initiating user of the newer A/V data stream may not have actively desired to degrade the existing A/V data stream. However, the initiating user may have no way to determine if the network could support both A/V streams prior to initiating the newer A/V stream.

Further, a network administrator may have no mechanism to restrict A/V data streams or limit the amount of network bandwidth that can be consumed by A/V data streams. Many networks inherently give A/V data streams higher priority than other types of data because data lost from A/V data streams typically cannot be recovered. Thus, when congestion occurs on a network link, A/V data streams may be given bandwidth due to higher priority. Bandwidth given to an A/V data stream during congestion may reduce the bandwidth available to other non-streaming data, causing the transfer of non-streaming data to degrade. For example, transmission of an A/V data stream might delay, or even prevent, transmission of a Web page, when there is not enough bandwidth capacity to appropriately transmit both the A/V data stream and the Web page.

Therefore systems, methods, and computer program products for controlling the admission of data streams onto a network would be advantageous.

BRIEF SUMMARY OF THE INVENTION

The foregoing problems with the prior state of the art are overcome by the principles of the present invention, which are directed towards methods, systems, and computer program products for controlling admission of data streams onto a network. A transmitting computer system is network connectable to a receiving computer system via a network data path having one or more data links, including at least a transmitting side data link and a receiving side data link. The transmitting computer system receives a requested application data transfer rate from an application that requests delivery of an application data stream from the transmitting computer system to the receiving computer system.

The transmitting computer system passively detects the transmitting side data load. The transmitting side data load is subtracted from the acceptable transmitting side data link capacity, such as, for example, 10 mega-bits per second ("Mbps"), to calculate the available transmitting side bandwidth. When the available transmitting side bandwidth is greater than the requested application data transfer rate, the available transmitting side bandwidth is viewed as sufficient to receive the application data stream. Depending on network configuration, the transmitting side computer system also sends instructions to the receiving side computer system to calculate the available receiving side bandwidth. When the available receiving side bandwidth is greater than the requested application data transfer rate, the available receiving side bandwidth is viewed as sufficient to receive the application data stream. In response to the available transmitting side bandwidth and, if appropriate, the available receiving side bandwidth being sufficient, the transmitting computer system initiates more active testing.

The transmitting computer system transmits a first packet-pair data packet and then subsequently transmits a second packet-pair data packet, both via the network data path, to the receiving computer system. The receiving computer system receives the first packet-pair data at a first reception time and the second packet pair data packet at a second reception time. Based at least on the difference in the first reception time and the second reception time, the bottleneck bandwidth of the network data path is estimated. When the bottleneck bandwidth is greater than the requested application data transfer rate, the available network data path bandwidth is viewed as sufficient to receive the application data stream. In response to the available network data path bandwidth being sufficient, the transmitting computer system initiates more active testing.

The transmitting computer system identifies parameters for configuring trains of data packets to simulate transmitting the application data stream at the requested application data transfer rate. The transmitting computer system temporarily transmits a train of data packets in accordance with the identified parameters to simulate transmission of the application data stream. The receiving computer system receives at least some of the data packets in the train of packets. The receiving computer system calculates that the train of data packets did not cause the network data path to transition into a congested state.

In some embodiments, the transmitting computer system initially transmits a train of diagnostic data packets onto the network data path at a specified fraction (e.g., $\frac{1}{100}^{th}$) of the estimated bottleneck bandwidth. The specified fraction of the estimated bottleneck bandwidth represents a diagnostic data transfer rate with a significantly reduced likelihood of causing congestion on the network data path. The receiving computer system receives at least some of the diagnostic data packets. From among the received diagnostic data packets, the receiving computer system identifies the number of delayed diagnostic data packets (e.g., those diagnostic data packets received after a specified time threshold).

The transmitting computer system then temporarily transmits a train of target data packets onto the network data path at the requested application data transfer rate. The train of target data packets is temporarily transmitted to simulate transmission of the application data stream in a manner that has a reduced likelihood of causing congestion on the network data path. The receiving computer system receives at least some of the target data packets. From among the received target data packets, the receiving computer system identifies the number of delayed target data packets (e.g., those target data packets received after the specified time threshold).

The receiving computer system compares the number of delayed target data packets to the number of delayed diagnostic data packets. When the number of delayed target packets is within a specified delayed packets threshold of the number of delayed diagnostic data packets, it is determined that the application data stream will not cause congestion on network data path. The receiving computer system sends the results of the comparison to the transmitting computer system. Accordingly, the transmitting computer system transmits the application data stream onto the network data path.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
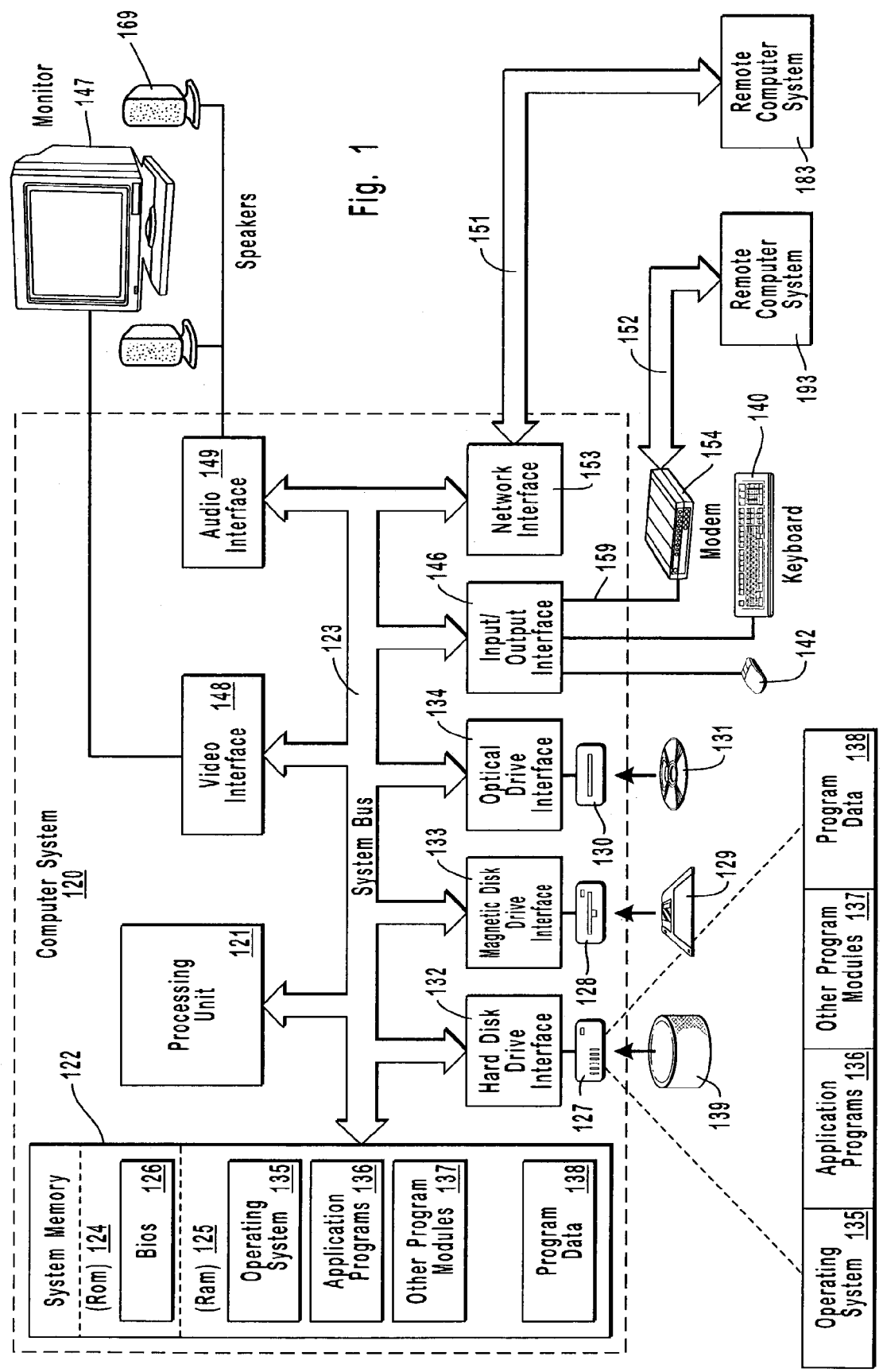
FIG. 1 illustrates a suitable operating environment for the principles of the present invention.

The principles of the present invention provide for controlling admission of data streams onto a network. Appropriate determinations in a series of tests, which transition from more passive tests to more active tests, control the admission of data streams onto a network data path. More passive tests can include promiscuous mode measurements at a transmitting side data link of the network data path and, if appropriate, at a receiving side data link of the network data path. When the transmitting side data link and/or the receiving side data link do not have sufficient available bandwidth to support an application data stream, testing ceases and the application data stream is not transmitted onto the network. On the other hand, when the transmitting side data link and, if appropriate, the receiving side data link do have sufficient available bandwidth to support the application data stream, more active testing, such as, for example, a packet-pair test and/or active network probing, is performed.

When appropriate, a packet-pair test is performed to calculate the bottleneck bandwidth of the network data path. When the bottleneck bandwidth is not sufficient to support the application data stream, testing ceases and the application data stream is not transmitted onto the network. On the other hand, when the bottleneck bandwidth is sufficient to support the application data stream, more active testing, such as, for example, active network probing, is performed.

When appropriate, the network data path is actively probed (e.g. by transmitting trains of data packets) to identify the likelihood of the application data stream causing congestion on the network data path, if the application data stream were to be transmitted onto the network data path. When an increased likelihood of causing congestion is identified, the application data stream is not delivered onto the network data path. On the other hand, when a reduced likelihood of causing congestion is identified, the application data stream can be delivered onto the network data path.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "data stream" is defined as data that is transferred in a steady and continuous stream such that portions of the transferred data can be output as they are received (even if received before completion of the data stream). A data stream can be an audio and/or video data stream (e.g., an Audio/Video "A/V" data stream) that is delivered from a transmitting computer system for output at a receiving computer system. Data streams can be a live data streams, such as, for example, a data stream of live radio or television broadcast data. Likewise, data streams can result when a stored file at a transmitting computer system is transferred to a receiving computer system, such as, for example, a data stream that results when a stored Motion Pictures Expert Group ("MPEG") file is selected. Data included in a data stream may or may not be saved at a receiving computer system after the data is output. Data streams can be transferred using a wide variety of protocols or combination of protocols, such as, for example, User Datagram Protocol ("UDP"), Real-Time Transport Protocol ("RTP"), and Real Time Streaming Protocol ("RTSP").

In this description and in the following claims, "data transfer rate" is defined as the speed with which data is transferred (or is to be transferred) onto a data link, across a data link, or received from a data link. A data transfer rate can be measured in a variety of different units, such as, for example, Megabits per second ("Mbps") and Megabytes per second ("MBps"). For example, application module 202 may cause an audio data stream to be transmitted at a data transfer rate of 2 Mbps (across data links 272 and 271) to computer system 221. Before a data stream is transmitted onto a data link, an application module may indicate an estimated peak data transfer rate of the data stream to a network probing module.

In this description and the following claims, a "data hub" is defined as a computer system that operates as a common connection point (either wired or wireless) for other computer systems and transfers electronic data between connected computer systems by sending received data packets out all the ports of the hub. That is, when a data packet is received at one port of a data hub, the data hub copies the packet to all of the other ports of the data hub. As a result, a data packet received from one data link connected to the data hub is subsequently transferred to all the other data links connected to the data hub. For example, a data packet received at data hub 250 via data link 271 would subsequently be transmitted to data links 271, 272, 273 and 277.

In this description and the following claims, a "data switch" is defined as a computer system that operates as a common connection point (either wired or wireless) for other computer systems and transfers electronic data between connected computer systems by sending received data packets out ports that correspond to destination address included in data packets. That is, when a data packet is received at one port of the data switch, the data switch reads a destination address (e.g., an Internet Protocol ("IP") address) of the data packet and sends the data packet to the port corresponding to the destination address. As a result, a data packet received from one data link is subsequently transferred to a data link that is nearer to the destination computer system associated with the destination address.

A data link that is nearer to the destination computer system may be a data link that is connected to the destination computer system. For example, data switch 255 may receive a data packet having a destination address that corresponds to computer system 251. Accordingly, data switch 255 can transmit the data packet onto data link 279. On the other hand, a data link that is nearer to the destination computer system may be an intermediate data link between a sending computer system and a destination computer system. For example, computer system 211 may send a data packet to a destination address associated with computer system 241. Accordingly, data hub 250 repeats the data packet onto data link 277 (as well as data links 271, 272 and 273). Data switch 255 can receive the data packet from data link 277 and read the destination address of the data packet. Accordingly, data switch 255 can send the data packet to data link 278 (after which data switch 260 can receive the data packet from data link 278 and send the data packet to data link 276).

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, an example system for implementing the invention includes a general-purpose computing device in the form of computer system 120, including a processing unit 121, a system memory 122, and a system bus 123 that couples various system components including the system memory 122 to the processing unit 121. Processing unit 121 can execute computer-executable instructions designed to implement features of computer system 120, including features of the present invention. The system bus 123 may be any of several types of bus structures including a memory bus or memory controller, a peripheral bus, and a local bus using any of a variety of bus architectures. The system memory includes read only memory ("ROM") 124 and random access memory ("RAM") 125. A basic input/output system ("BIOS") 126, containing the basic routines that help transfer information between elements within computer system 120, such as during start-up, may be stored in ROM 124.

The computer system 120 may also include magnetic hard disk drive 127 for reading from and writing to magnetic hard disk 139, magnetic disk drive 128 for reading from or writing to removable magnetic disk 129, and optical disk drive 130 for reading from or writing to removable optical disk 131, such as, or example, a CD-ROM or other optical media. The magnetic hard disk drive 127, magnetic disk drive 128, and optical disk drive 130 are connected to the system bus 123 by hard disk drive interface 132, magnetic disk drive-interface 133, and optical drive interface 134, respectively. The drives and their associated computer-readable media provide nonvolatile storage of computer-executable instructions, data structures, program modules, and other data for the computer system 120. Although the example environment described herein employs magnetic hard disk 139, removable magnetic disk 129 and removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 139, magnetic disk 129, optical disk 131, ROM 124 or RAM 125, including an operating system 135, one or more application programs 136, other program modules 137, and program data 138. A user may enter commands and information into computer system 120 through keyboard 140, pointing device 142, or other input devices (not shown), such as, for example, a microphone, joy stick, game pad, scanner, or the like. These and other input devices can be connected to the processing unit 121 through input/output interface 146 coupled to system bus 123. Input/output interface 146 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 147 or other display device is also connected to system bus 123 via video interface 148. Speakers 169 or other audio output device is also connected to system bus 123 via audio interface 149. Other peripheral output devices (not shown), such as, for example, printers, can also be connected to computer system 120.

Computer system 120 is connectable to networks, such as, for example, an office-wide or enterprise-wide computer network, a home network, an intranet, and/or the Internet. Computer system 120 can exchange data with external sources, such as, for example, remote computer systems, remote applications, and/or remote databases over such networks.

Computer system 120 includes network interface 153, through which computer system 120 receives data from external sources and/or transmits data to external sources. As depicted in FIG. 1, network interface 153 facilitates the exchange of data with remote computer system 183 via data link 151. Network interface 153 can logically represent one or more software and/or hardware modules, such as, for example, a network interface card and corresponding Network Driver Interface Specification ("NDIS") stack. Data link 151 represents a portion of a network (e.g., an Ethernet segment), and remote computer system 183 represents a node of the network. For example, remote computer system 183 can be a transmitting computer system that transmits data streams to computer system 120. On the other hand, remote computer system 183 can be a receiving computer system that receives data streams transmitted from computer system 120.

Likewise, computer system 120 includes input/output interface 146, through which computer system 120 receives data from external sources and/or transmits data to external sources. Input/output interface 146 is coupled to modem 154 (e.g., a standard modem, a cable modem, or digital subscriber line ("DSL") modem) via data link 159, through which computer system 120 receives data from and/or transmits data to external sources. As depicted in FIG. 1, input/output interface 146 and modem 154 facilitate the exchange of data with remote computer system 193 via data link 152. Data link 152 represents a portion of a network and remote computer system 193 represents a node of the network. For example, remote computer system 193 may be a transmitting computer system that transmits data streams to computer system 120. On the other hand, remote computer system 193 may be a receiving computer system that receives data streams transmitted from computer system 120.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, application modules, network interface modules, and probing modules as well as associated data, including data packets, transmission parameters, and data streams may be stored and accessed from any of the computer-readable media associated with computer system 120. For example, portions of such modules and portions of associated program data may be included in operating system 135, application programs 136, program modules 137 and/or program data 138, for storage in system memory 122.

When a mass storage device, such as, for example, magnetic hard disk 139, is coupled to computer system 120, such modules and associated program data may also be stored in the mass storage device. In a networked environment, program modules depicted relative to computer system 120, or portions thereof, can be stored in remote memory storage devices, such as, system memory and/or mass storage devices associated with remote computer system 183 and/or remote computer system 193. Execution of such modules may be performed in a distributed environment as previously described.

Figure 2:
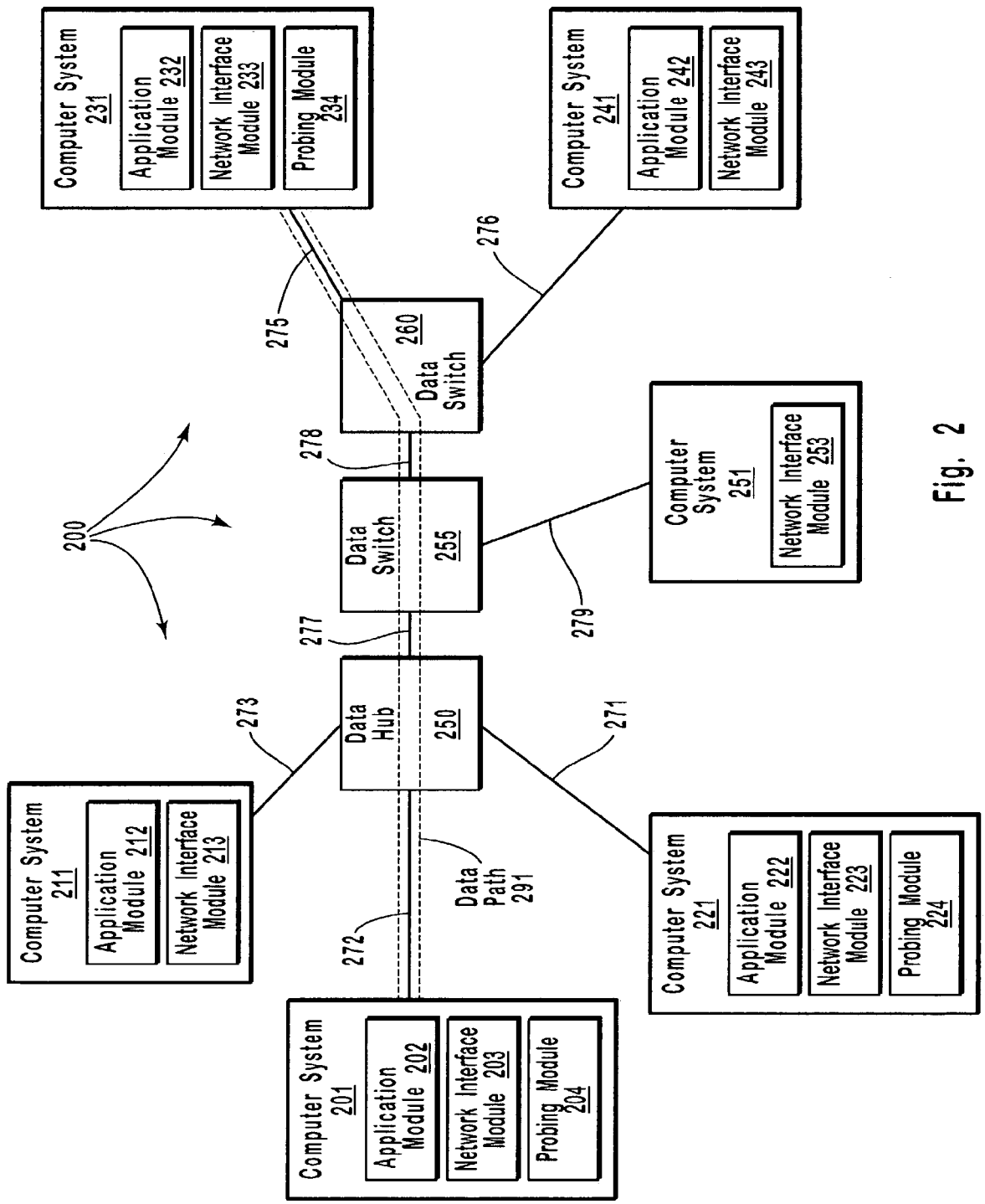
FIG. 2 illustrates an example of a network architecture that facilitates controlling the admission data streams onto a network.

FIG. 2 illustrates an example of network architecture 200 that facilitates controlling the admission of data streams onto a network. Included in network architecture 200 are computer systems 201, 211, 221, 231, 241, and 251. Computer systems 201, 211, and 221 are connected to data hub 250 by corresponding data links 272, 273, and 271 respectively. Computer systems 201, 211, and 221 include corresponding network interface modules 203, 213, and 223 respectively for sending electronic data and receiving electronic data.

Data hub 250 is connected to data switch 255 by data link 277. Likewise, computer system 251 is connection to data switch 255 by data link 279. Computer system 251 includes network interface module 253 for sending electronic data and receiving electronic data. Data switch 255 is connected to data switch 260 by data link 278. Computer systems 231 and 241 are connected to data switch 260 by corresponding data links 275 and 276 respectively. Computer systems 231 and 241 include corresponding network interface modules 233 and 243 respectively for sending electronic data to and receiving electronic data from data switch 260.

Data streams (e.g., UDP data streams) can be transferred between the computer systems in network architecture 200 and between computer systems in network architecture 200 and computer systems external to network architecture 200 (not shown). Computer systems in network architecture 200 may transfer data streams as a result of a transmitting application at one computer system requesting that a data stream be transferred to a corresponding receiving application at another computer system. For example, application module 212 may request transfer of an application data stream to application module 242. Accordingly, network interface module 213 can transmit a data stream containing appropriate application data and having a destination address (e.g., an IP address) corresponding to computer system 241 onto data link 273. Network interface module 243 can receive the transmitted data stream from data link 276 and cause contained application data to be delivered to application 242.

Non-streaming data can also be transferred between the computer systems in network architecture 200 and between computer system in network architecture 200 and computer systems external to network architecture 200. For example, computer system 251 may be a server that transfers data to other computer system in a non-streaming manner. When another computer system requests a file stored at computer system 251, network interface module 253 can respond by sending data packets containing the requested file and having a destination address of the requesting computer system.

For example, application module 222 may be a Web browser that requests a Web page stored at computer system 251. Accordingly, computer system 251 can respond by transmitting the requested Web page onto data link 279 for delivery to computer system 221. Network interface module 253 can facilitate the transmission of the requested Web page, by sending an HTTP message including the Web page (e.g., as one or more Transmission Control Protocol ("TCP") segments) to computer system 221. Network interface module 223 can receive the Web page from data link 271 and cause the Web page to be delivered to application module 222.

Accordingly, the data links in network architecture 200 may experience varied data loads due to streaming and non-streaming data being transferred across the data links. When data is transmitted onto a data link, some portion of the data link's bandwidth is consumed thereby decreasing the available bandwidth of the data lank. Conversely, when data is removed from a data link (e.g., after completion of a file transfer or the end of a data stream) some portion of the data link's bandwidth is freed up thereby increasing the available bandwidth of the data link.

Figure 3A:
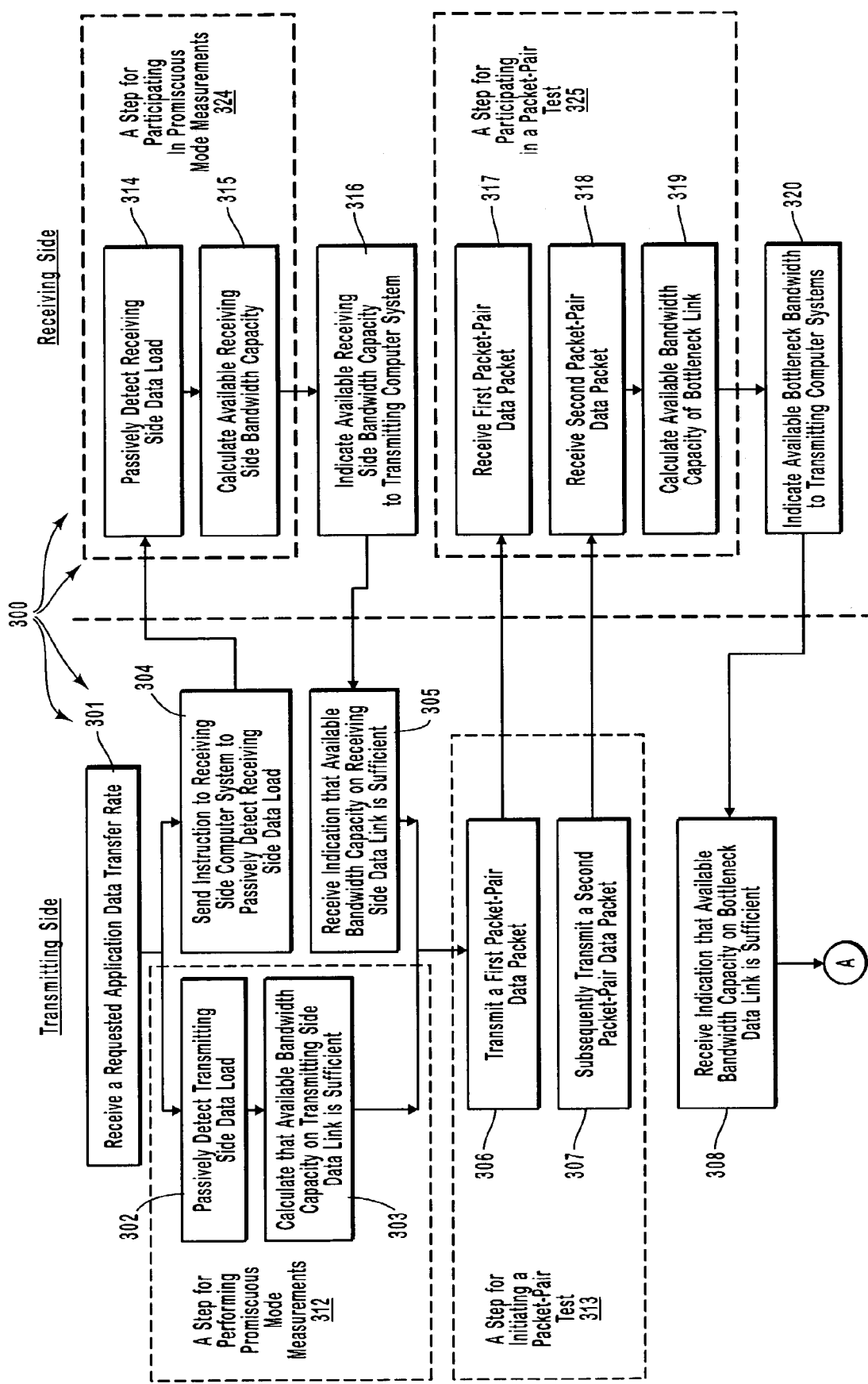
FIGS. 3A and 3B illustrates an example flowchart of a method for estimating that a transmitting computer system can deliver an application data stream to a receiving computer system without congesting a network data path.
Figure 3B:
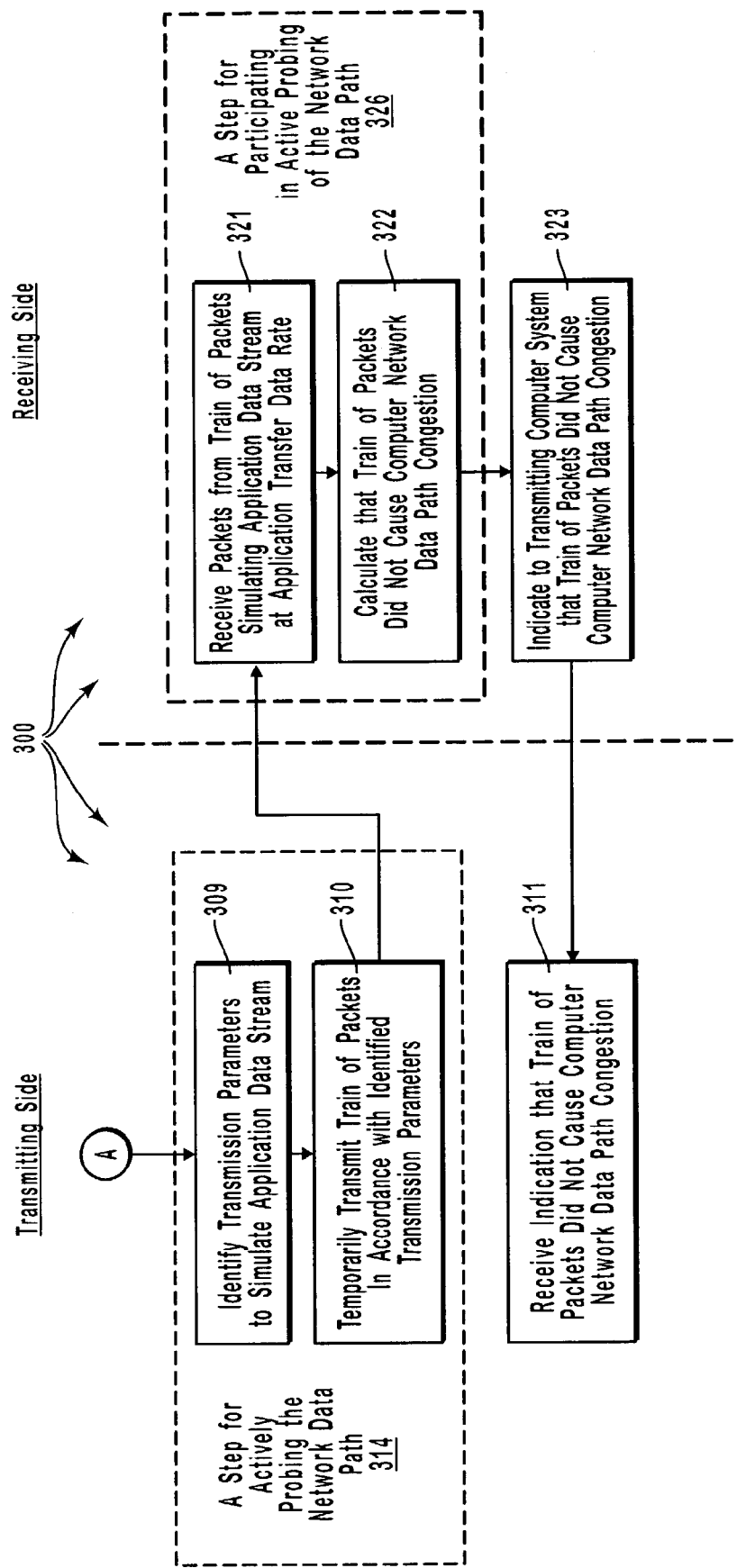

FIGS. 3A and 3B illustrate an example flowchart of a method 300 for estimating that a transmitting computer system can deliver an application data stream to a receiving computer system without congesting a network data path. The method 300 will be described with respect to the computer systems depicted in network architecture 200.

The method 300 includes an act of receiving a requested application data transfer rate (act 301). Act 301 can include receiving a requested application data transfer rate from an application that requests delivery of an application data stream from a transmitting computer system to a receiving computer system. For example, probing module 204 can receive an application data transfer rate for an application data stream that application module 202 is requesting be delivered from computer system 201 to computer system 221 or to computer system 231. It may be that a requested application data transfer rate is a peak data transfer rate that is to be used during transmission of an data stream The method 300 includes a functional result-oriented step for performing promiscuous mode measurements (step 312). Step 312 can include any corresponding acts for accomplishing the result of performing promiscuous mode measurements. However, in the illustrated example of FIG. 3, the step 312 includes a corresponding act of passively detecting a transmitting side data load (act 302). Act 302 can include passively detecting a transmitting side data load on the transmission side data link.

A transmitting side computer system may be a transmitting computer system that is to transmit a data stream. For example, in response to receiving a requested application data rate from application module 202, probing module 204 can configure network interface module 203 to receive all the data packets that are transferred across data link 272. Based at least on the frequency with which data packets are received and the size of received data packets, probing module 204 can estimate the data load on data link 272. Since computer system 201 is connected to data hub 250, the data load on data link 272 is calculated from all the data packets being transmitted on data links 271, 272, 273 and 277. For example, it may be that computer system 221 is transferring a first data stream to computer system 211 at 3 Mbps and transferring a second data stream to data switch 255 (e.g., for deliver to computer system 231) at 2 Mbps. Accordingly, the data load on data link 272 would at least be 5 Mbps.

Alternately, a transmitting side computer system may be a computer system that is connected along with the transmitting computer system to a common data hub. For example, when computer system 201 (the transmitting computer system) is to transmit a data stream to computer system 231 via data path 291, probing module 204 may send an instruction to probing module 224 to passively detect a transmitting side data load. Accordingly, probing module 224 can configure network interface module 223 to receive all the data packets that are transferred across data link 271. Since data hub 250 transmits data packets from all connected data links to all the other connected data links (data links 271, 272, 273 and 277), the data load on data link 271 will be similar to the data load on data link 272.

Passive detection of a data load can occur without sending any data packets onto a data link. For example, probing module 204 can detect a data load on data link 272 without sending any data packets onto data link 272. Accordingly, there is a significantly reduced chance that passive detection of a data load on a data link 272 would degrade other data being transferred through data hub 250.

Step 312 also includes a corresponding act of calculating that the available bandwidth capacity on the transmitting side data link is sufficient (act 303). Act 303 can include calculating that, based on the detected transmitting side data load, the available bandwidth capacity on the transmitting side data link is sufficient to receive a data stream at the requested application data transfer rate. Available bandwidth capacity for a data link can be calculated according to Equation 1:

$$\text{Available\_Link\_Bandwidth} = [(\text{Acceptable\_Loading}) \cdot (\text{Link\_Capacity})] - \text{Data}_{13}\text{Link\_Load} \qquad \text{Equation 1}$$

Acceptable_Loading is a value that can be selected according to the desires of a network administrator or user to represent a percentage of available bandwidth that can be consumed by data streams. When it is desirable to allow reduced available bandwidth for data streams, an Acceptable_Loading value can be decreased. For example, when it is desirable to utilize 30% of a data link's capacity for data streams, an Acceptable_Loading value of "0.3" can be selected. On the other hand, when it is desirable to allow increased available bandwidth for data streams, an Acceptable_Loading value can be increased. For example, when it is desirable to utilize 90% of a data link's capacity for data streams, the Acceptable_Loading value can be set to "0.9". When it is desirable to utilize the full capacity of a data link for data streams, an Acceptable_Loading value can be set to "1". It may be that an Acceptable_Loading value is selected to utilize as much data link capacity as possible for data streams without causing a data link to become congested. On the other hand, an Acceptable_Loading value may be selected to conserve some amount of available bandwidth for transmission of non-streaming data.

Link_Capacity is a value representing the rated data capacity (e.g., in Mbps) of a data link (e.g., data link 272). Link_Capacity can vary depending on technologies, such as, for example, Ethernet (IEEE 802.3 standards) or Wireless (IEEE 802.11 standards), used to implement a data link. Further, implementations of a particular technology can have different rated data capacities. For example, an Ethernet data link can have a rated data capacity of 10 Mbps, 100 Mbps, or 1,000 Mbps (Gigabit). Similarly, an IEEE 802.11 data link can have a rated data capacity of 11 Mbps, 5.5 Mbps, 2 Mbps, or 1 Mbps. However, it should be understood that the present invention is not limited to the described network technologies and rated data capacities. It would be apparent to one skilled in the art, after having reviewed this description, that a wide variety of network technologies and rated data capacities, in addition to those described, can be utilized when practicing the present invention.

Data_Link_Load is a value representing a data load on a data link, such as, for example, a passively detected transmitting (or receiving) side data load on a transmitting (or receiving) side data link.

The values of Equation 1 can be combined according to the arithmetic operators of Equation 1 to calculate an Available_Link_Bandwidth value. That is, a Data_Link_Load value is subtracted from the product of an Acceptable_Loading value multiplied by a Link_Capacity value. For example, data link 272 may have a Link_Capacity value of 10 Mbps and a Data_Link_Load value of 2 Mbps. Further, an network administrator or user of network architecture 200 may have selected an Acceptable_Loading value of "0.7" for data link 272. Thus in this example, an Available_Link_Bandwidth value for data link 272 would be equal to [(0.7)·(10 Mbps)]−2 Mbps, or 5 Mbps.

When the calculated Available_Link_Bandwidth value for the transmitting side data link is less than the requested application data transfer rate, the transmitting side data link is viewed as not having sufficient available bandwidth capacity to support the application data stream at the requested application data rate. Referring to the immediately preceding example, data link 272 would not be viewed as having sufficient available bandwidth to receive an application data stream at any data rate greater than 5 Mbps. Allowing data to be transferred across a data link at an overall data transfer rate (i.e., the sum of all the data loads on the data link) greater than the link capacity of the data link has an increased likelihood of causing congestion on the data link. Accordingly, when a data link does not have sufficient available bandwidth capacity to support the requested application data rate, the application data stream is not transmitted onto the data link and testing may be terminated. As a beneficial result, a data stream having an increased likelihood of congesting a data link is prevented from being transmitted onto the data link.

On the other hand, when the calculated Available_Link_Bandwidth value for the transmitting side data link is greater than (or equal to) the requested application data transfer rate, the transmitting side data link is viewed as having sufficient available bandwidth capacity to support the application data stream at the requested application data rate. Referring to the immediately preceding example, data link 272 would be viewed as having sufficient available bandwidth to support an application data stream at any application data rate less than or equal to 5 Mbps. Allowing data to be transferred across a data link at an overall data transfer rate less than or equal to link capacity of the data link has a decreased likelihood of causing congestion on the data link. As a result, when a data link can support a requested application data rate, more active testing, such as, for example, a packet-pair test and/or active network probing, can be performed to more precisely determine the likelihood of the application data stream causing congestion on a network data path.

Depending on network configuration, the transmitting side computer system may also send an instruction to the receiving side computer system to passively detect the receiving side data load (act 304). It may be that a transmitting side data link (e.g., data link 272) and a receiving side data link (e.g., data link 271) are connected to the same data hub (e.g., data hub 250) and have the same Link_Capacity and Acceptable_Loading values. Accordingly, detecting an Available_Local_Bandwidth for both the transmitting side data link and the receiving side data link may be viewed as redundant. Thus in these network configurations, a transmitting computer system may not send instructions to the receiving side computer system. For example, probing module 204 may not send instructions to probing module 224 when application module 202 requests transmission of a data stream to application module 222.

On the other hand, it may be that the transmitting side data link (e.g., data link 272) and receiving side data link (e.g., data link 275) are at ends of a network data path (e.g., data path 291) separated by a switch and/or have different Link_Capacities and/or have different Acceptable_Loading values. Accordingly, detecting an Available_Local_Bandwidth for both the transmitting side data link and the receiving side data link may not be viewed as redundant. Thus in these network configurations, a transmitting computer system may send an instruction to the receiving side computer system. For example, probing module 204 may send instructions to probing module 234 when application module 202 requests transmission of a data stream to application module 232.

When appropriate, the method 300 includes a functional result-oriented step for a receiving computer system to participate in promiscuous mode measurements (step 324). Step 324 can include any corresponding acts for accomplishing the result of participating promiscuous mode measurements. However, in the illustrated example of FIG. 3, the step 324 includes a corresponding act of a receiving side computer system passively detecting a receiving side data load (act 314). Act 314 can include passively detecting a receiving side data load on the receiving side data link. A receiving side computer system may be a receiving computer system that is to receive a data stream. For example, when computer system 231 is to receive a data stream from computer system 201 via data path 291, probing module 232 can configure network interface module 233 to receive all the data packets that are transferred across data link 275.

Alternately, a receiving side computer system may be a computer system that is connected along with the receiving computer system to a common data hub. For example, when computer system 231 (the transmitting computer system) is to transmit a data stream to computer system 201 (the receiving computer system) via data path 291, probing module 234 may send an instruction to probing module 224 to passively detect a receiving side data load. Accordingly, probing module 224 can configure network interface module 223 to receive all the data packets that are transferred across data link 271. Since data hub 250 copies data packets from all connected data links to all other connected links (data links 271, 272, 273 and 277) the data load on 271 will be similar to the data load on data link 272.

The step 324 includes a corresponding act of calculating available receiving side bandwidth capacity (act 315). Act 315 can include a receiving side computer system calculating the available bandwidth capacity on the receiving side data link based on the detected receiving side data load. A receiving side computer system can calculate a receiving side data load according to Equation 1. The method 300 includes an act of indicating the available receiving side bandwidth capacity to the transmitting computer system (act 316). Act 316 can include a receiving side computer system indicating the available bandwidth of the receiving side data link to the transmitting computer system. For example, when computer system 231 is to receive a data stream from computer system 201, computer system 231 can indicate the available bandwidth capacity of data link 275 to computer system 201.

The method 300 includes an act of the transmitting side computer system receiving an indication that available bandwidth capacity on the receiving side data link is sufficient (act 305). Act 305 can include receiving an indication of the available bandwidth capacity on the receiving side data link from a receiving side computer system. When the calculated Available_Link_Bandwidth value (e.g., according to Equation 1) for the receiving side data link is less than the requested application data transfer rate, the receiving side data link is viewed as not having sufficient available bandwidth capacity to support the application data stream at the requested application data rate. Accordingly, when appropriate, the application data stream is not transmitted and testing may be terminated. On the other hand, when the calculated Available_Link_Bandwidth value for the receiving side data link is greater than (or equal to) the requested application data transfer rate, the receiving side data link is viewed as having sufficient available bandwidth capacity to support the application data stream at the requested application data rate. Accordingly, when appropriate, more active testing, such as, for example, a packet-pair test and/or active network probing, can be performed to more precisely determine the likelihood of the application data stream causing congestion on a network data path.

The method 300 includes a functional result-oriented step for initiating a packet-pair test (step 313). Step 313 can include any corresponding acts for accomplishing the result of initiating a packet-pair test. However, in the illustrated example of FIG. 3, the step 313 includes a corresponding act of transmitting a first packet-pair data packet (act 306). Act 306 can include a transmitting side computer system transmitting a first packet-pair data packet onto a network data path for delivery to a receiving side computer system. For example, it may be that computer system 201 initiates a packet-pair test with computer system 231. Accordingly, computer system 201 can transmit a first packet-pair data packet onto data path 291 for delivery to computer system 231.

Step 313 also includes a corresponding act of subsequently transmitting a second packet-pair data packet (act 307). Act 307 can include the transmitting side computer system transmitting a corresponding second packet-pair data packet onto the network data path for delivery to the receiving side computer system. The second packet-pair data packet is similar in size, or even the same size, as the first packet-pair data packet. A transmission time interval (e.g., a time interval between asynchronous send commands) can separate transmission of the first packet-pair data packet and the second packet-pair data packet. The value of a transmission time interval can be small enough such that the likelihood of packet-pair data packets being queued at a bottleneck link of the network data path is significantly increased.

Alternately, packet-pair data packets can be transmitted from an intermediate transmitting computer system. For example, the results of a transmitting side promiscuous mode measurement may indicate that a transmitting side data link has sufficient available bandwidth capacity to support an application data stream. As such, transmitting packet-pair data packets across the transmitting side data link may be redundant. For example, when it is indicated that data link 272 (and thus also data link 277) has sufficient available capacity bandwidth to support an application data stream, packet-pair data packets may be sent from data switch 255.

The method 300 includes a functional result-oriented step for the receiving side computer system to participate in a packet-pair test (step 325). Step 325 can include any corresponding acts for accomplishing the result of participating in a packet-pair test. However, in the illustrated example of FIG. 3, the step 325 includes a corresponding act of receiving a first packet-pair data packet (act 317). Act 317 can include the receiving side computer system receiving the first packet-pair data packet from a network data path at a first reception time. Step 325 also includes a corresponding act of receiving a second packet-pair data packet (act 318). Act 318 can include the receiving side computer system receiving a second packet-pair data packet from the network data path at a second reception time.

Alternately, packet-pair data packets can be received at an intermediate receiving computer system. For example, the results of receiving side promiscuous mode measurements may indicate that a receiving side data link has sufficient available bandwidth to receive an application data stream. As such, receiving packet-pair data packets across the receiving side data link may be redundant. For example, when it is indicated that data link 275 has sufficient available bandwidth to receive an application data stream, packet-pair data packets may be received at data switch 260.

Step 325 includes a corresponding act of calculating the available bandwidth capacity of the bottleneck link (act 319). Act 319 can include calculating the available bandwidth capacity on the bottleneck data link of the network data path based at least on the difference between the first reception time and the second reception time. Although depicted in method 300 as occurring at the receiving side, a receiving side or intermediate receiving computer system can send bottleneck data (including the first and second reception times) to a transmitting side or intermediate transmitting computer system that calculates bottleneck bandwidth based on the received bottleneck data.

The bottleneck bandwidth of a network data path can at least be estimated by Equation 2:

$$\text{Bottleneck\_Bandwidth} = \text{Packet\_Size}/(\text{Second\_Recept\_Time} - \text{First\_Recept\_Time}) \quad \text{Equation 2}$$

Packet_Size is a value representing the size of the first packet-pair data packet and the second packet-pair data packet. When the first packet-pair data packet and the second packet-pair data packet are not identical in size, this value may represent an average of the size of the first packet-pair data packet and the size of the second packet-pair data packet. First_Recept_Time is a value representing the time the first packet-pair data packet was received at the receiving side or intermediate receiving computer system. Similarly, Second_Recept_Time is a value representing the time the second packet-pair data packet was received at the receiving side or intermediate receiving computer system.

The values of Equation 2 can be combined according to the arithmetic operators of Equation 2 to calculate a Bottleneck_Bandwidth value. That is, a Packet_size value is divided by the difference of a Second_Recpt_Time value subtracted from a First_Recept_Time value. For example, computer system 231 may receive a first packet-pair data packet via data path 291 having a Packet_Size value of 32,768 bits (4,096 bytes) at 09:56:05.234 (a First_Recept_Time value). Subsequently, computer system 231 may receive a second packet-pair data packet via data path 291 with a Packet_Size value of 32,768 bits at 09:56:05.250 (a Second_Recept_Time value). Thus in this example, an estimated Bottleneck_Bandwidth value would equal 32,786 bits/(0.250 sec−0.234 sec), or approximately 2 Mbps.

It may be that a transmitting side or intermediate transmitting computer system includes the first and second packet-pair data packets in a packet-pair train of constant sized, back-to-back data packets (each data packet being separated by a constant packet-pair transmission time interval) that are transmitted across a network data path to the receiving side or intermediate receiving computer system. Transmission of a packet-pair train can be used to implement any of a variety of different packet-pair algorithms, such as, for example, Receiver Only Packet Pair ("ROPP") algorithms, Receiver Based Packet Pair ("RBPP") algorithms, and Sender Based Packet Pair ("SBPP") algorithms, for calculating a bottleneck bandwidth for a network data path. Any of these packet-pair algorithms (or any other packet-pair algorithm) can be implemented to calculate a bottleneck bandwidth value for data path 291. Probing modules, such as, for example, probing modules 204, 224, and/or 234 can be configured with appropriate functionality for implementing packet-pair algorithms. Packet-pair filtering techniques, such a, for example, a histogram, can be utilized to increases the accuracy of packet-pair algorithms.

In some embodiments, an intermediate transmitting computer system transmits at least a first and second packet-pair data packet to an intermediate receiving computer system. For example, the results of promiscuous mode measurements may indicate that both a transmitting side data link and receiving side data link have sufficient available bandwidth capacity to support an application data stream. As such, transmitting and receiving packet-pair data packets across these data links may be redundant. For example, when it is indicated that data link 271 and data link 276 have sufficient available bandwidth capacity to support an application data stream, packet-pair data packets may be transmitted from data switch 255 to data switch 260. Accordingly, data switch 255 or data switch 260 can then calculate the bottleneck bandwidth for data link 278.

The method 300 includes an act of indicating the available bottleneck bandwidth to the transmitting computer system (act 320). Act 320 can include a receiving side or intermediate receiving computer system indicating the available bottleneck bandwidth capacity to a transmitting side or intermediate transmitting computer system. The method 300 includes an act of receiving an indication that available bandwidth capacity on the bottleneck data link is sufficient (act 308). Act 308 can include a transmitting side or intermediate transmitting computer system receiving an indication that the available bandwidth capacity of the bottleneck data link is sufficient to support a data stream at the requested application data transfer rate.

In some embodiments, a specified bottleneck loading value (e.g., 0.2, 0.7, etc.) limits the bottleneck bandwidth capacity than can be consumed by data streams. A specified bottleneck loading value can be selected according to the desires of a network administrator or user. When it is desirable to allow reduced bottleneck bandwidth for data streams, the specified bottleneck loading value can be decreased. For example, to allow 20% of a network data path's bottleneck bandwidth for data streams, a Bottleneck_Bandwidth value can be multiplied by a specified bottleneck loading value of "0.2" to calculate an Available_Bottleneck_Bandwidth value.

On the other hand, when it is desirable to allow increased bottleneck bandwidth for data streams, the specified bottleneck loading value can be increased. For example, to allow 70% of a network data path's bottleneck bandwidth for data streams, a Bottleneck_Bandwidth value can be multiplied by a specified bottleneck loading value of "0.7" to calculate an Available_Bottleneck_Bandwidth value. When it is desirable to allow all of a network data path's bottleneck bandwidth for data streams, a specified bottleneck loading value can be set to "1". It may be that a specified bottleneck loading value is selected to utilize as much bottleneck bandwidth as possible without causing the network data path to become congested. On the other hand, a specified bottleneck loading value may be selected to conserve some amount of bottleneck bandwidth for transmission of non-streaming data.

When a calculated Bottleneck_Bandwidth value (or when appropriate a calculated Available_Bottleneck_Bandwidth value) is less than the requested application data transfer rate, the network data path is viewed as not having sufficient available bandwidth capacity to support the application data stream at the requested application data transfer rate. Accordingly, the application data stream is not transmitted onto the network data path and testing may be terminated. As a beneficial result, a data stream having an increased likelihood of congesting a network data path is prevented from being transmitted onto the network data path.

On the other hand, when a calculated Bottleneck_Bandwidth value (or when appropriate a calculated Available_Bottleneck_Bandwidth value) for a network data path is greater than (or equal to) the requested application data transfer rate, the network data path is viewed as having sufficient available bandwidth capacity to support the application data stream at the requested application data rate. As a result, more active testing, such as, for example, active network probing, can be performed to more precisely determine the likelihood of the application data stream causing congestion on the network data path The method 300 includes a functional result-oriented step for actively probing a network data path (step 314). Step 314 can include any corresponding acts for accomplishing the result of actively probing a network data path. However, in the illustrated example of FIG. 3, the step 314 includes a corresponding act of identifying transmission parameters to simulate the application data stream (act 309). Act 309 can include a transmitting computer system identifying transmission parameters for configuring trains of data packets to simulate transmitting the application data stream at the requested application data transfer rate.

For example, the transmitting computer system may identify a probing data packet size value, packets per train value, a probing data packet interval value, and a probing train interval value. A probing data packet size value represents the size of probing data packets (e.g., in bits or bytes) included in a train of probing data packets. For example, a probing data packet size value of 4,096 could represent that probing data packets included in a train of probing data packets are to have a size of 4,096 bits or 4,096 bytes (32,768 bits). A packets per train value represents the number of probing data packets that are to be included in a train of probing data packets. For example, a packets per train value of 10 could represent that 10 probing data packets are to be included in a train of probing data packets. A probing data packet interval value represents a time interval (e.g., in milliseconds) between the transmission of successive probing data packets in a train of probing data packets. For example, a probing data packet interval value of 1 could represent that probing data packets in a train of probing data packets are to be sent every 1 millisecond.

A probing train interval value represents a time interval (e.g., in milliseconds) between successive trains of probing data packets in a sequence of trains of probing data packets. For example, a probing train interval value of 90 could represent that successive trains of probing data packets are to be sent every 90 milliseconds. Separating successive trains of probing data packets by a probing train interval value can potentially reduce capture effects (as queued data packets are allowed at the least the probing train interval time to be delivered) at data hubs and data switches. This decreases the likelihood of any of the trains of probing data packets degrading other data (either data streams or non-streaming data) being transmitted on a network data path.

Step 314 includes a corresponding act of temporarily transmitting a train of packets in accordance with the identified transmission parameters (act 310). Act 310 can include a transmitting computer system temporarily transmitting a train of probing data packets in accordance with the identified transmission parameters to simulate transmission of an application data stream onto the network data path. For example, probing module 204 can temporarily transmit a train of probing data packets onto data path 291 to simulate transmission of an application data stream at the requested application data transfer rate.

The method 300 includes a functional result-oriented step for participating in active probing of a network data path (step 326). Step 326 can include any corresponding acts for accomplishing the result of participating in active probing of a network data path. However, in the illustrated example of FIG. 3, the step 326 includes a corresponding act of receiving probing packets from a train of probing packets simulating an application data stream at an application data transfer rate (act 321). Act 321 can include a receiving computer system receiving at least some of the probing data packets in a train of probing data packets the transmitting computer system transmitted onto the network data path to simulate an application data stream at the requested application data transfer rate. For example, probing module 234 can receive probing data packets from a train of probing data packets transmitted by probing module 204.

Step 326 includes a corresponding act of calculating that a train of probing data packets did not cause network data path congestion (act 322). Act 322 can include a receiving side computer system calculating that the train of probing data packets did not cause any of the data links of the network data path to transition into a congested state. For example, probing module 234 may calculate that a train of probing packets received from probing module 204 did not cause any data links of data path 291 (i.e., data links 272, 277, 278, and 275) to transition into a congested state.

The method 300 includes an act of indicating to the transmitting computer system that the train of probing packets did not cause network data path congestion (act 323). Act 323 can include the receiving side computer system indicating to the transmitting side computer system that the train of probing data packets did not cause any of the data links of the network data path to transition into a congested state. For example, probing module 234 can indicate to probing module 204 that a train of probing data packets received on data path 291 did not congest data path 291.

The method 300 includes an act of receiving an indication that the train of probing data packets did not cause network data path congestion (act 311). Act 311 can include a transmitting side computer system receiving an indication from a receiving side computer system that the train of probing data packets did not cause any of the data links of the network data path to transition into a congested state. For example, probing module 204 can receive an indication from probing module 234 that a train of probing data packets did not congest data path 291.

Figure 4:
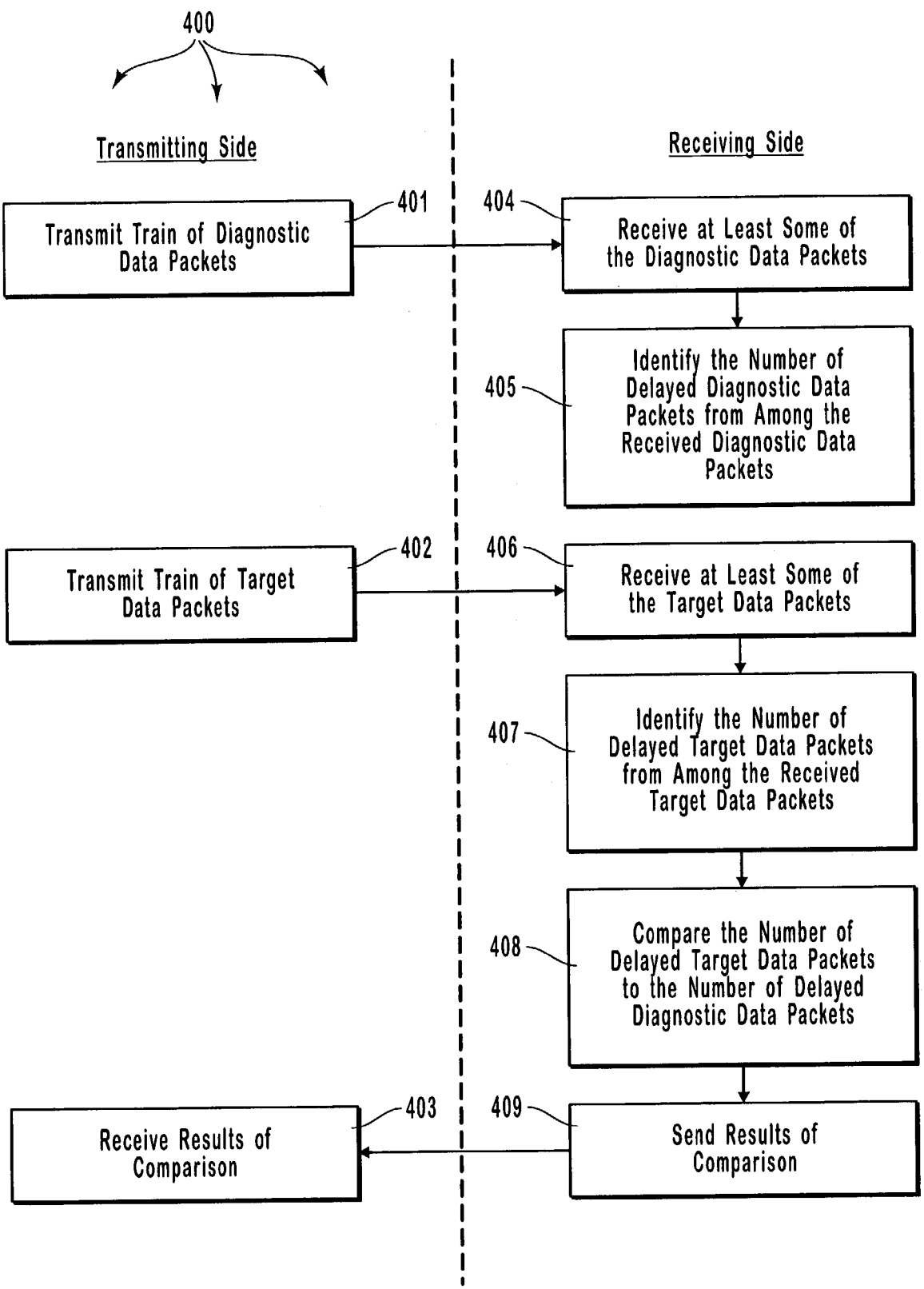
FIG. 4 illustrates an example flowchart of a method for estimating a likelihood of network data path congestion based on identified queuing delays.
Figure 5:
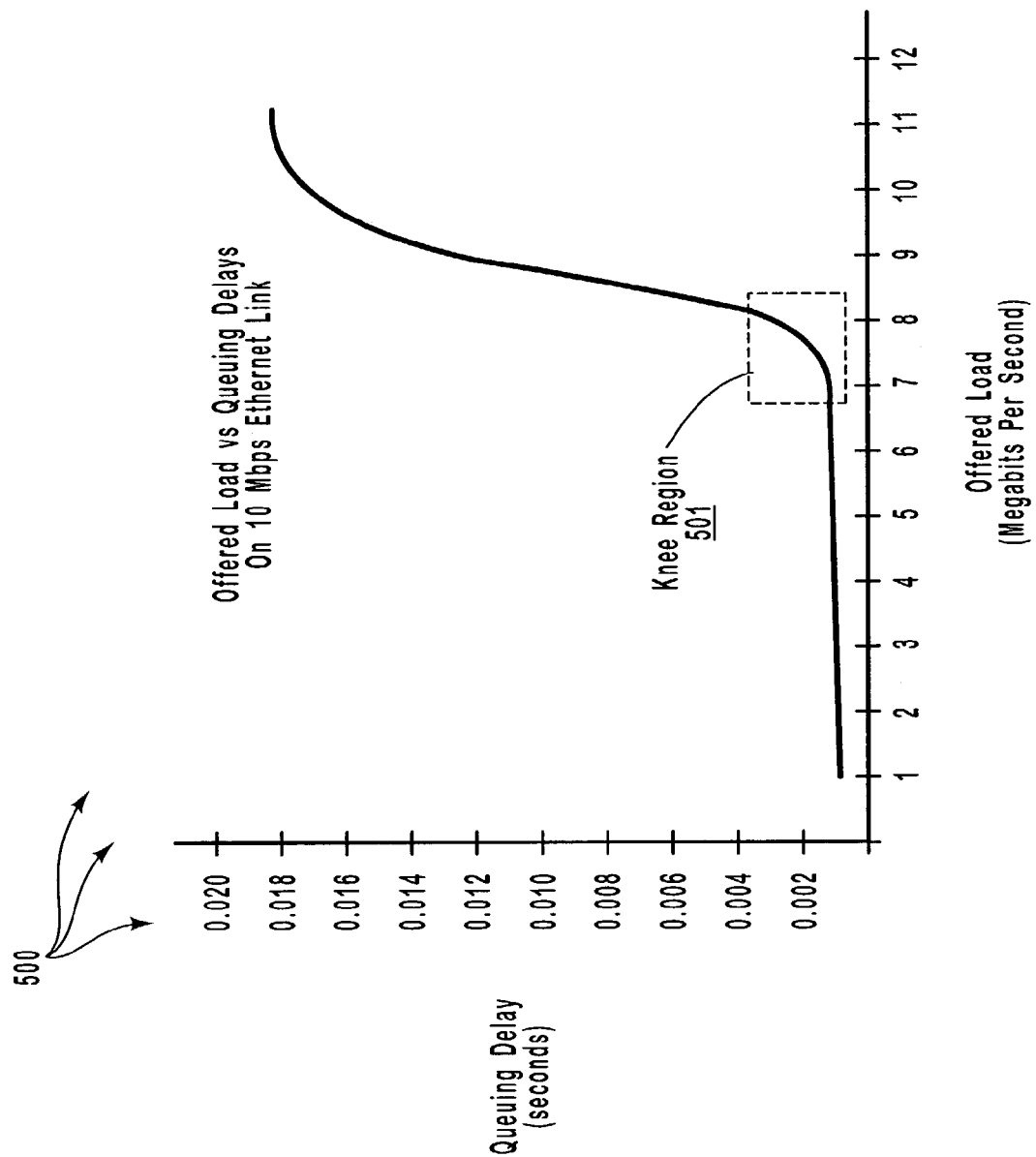
FIG. 5 illustrates an example graph of queuing delay versus offered load on a 10 Megabit per second Ethernet link.
Figure 6A:
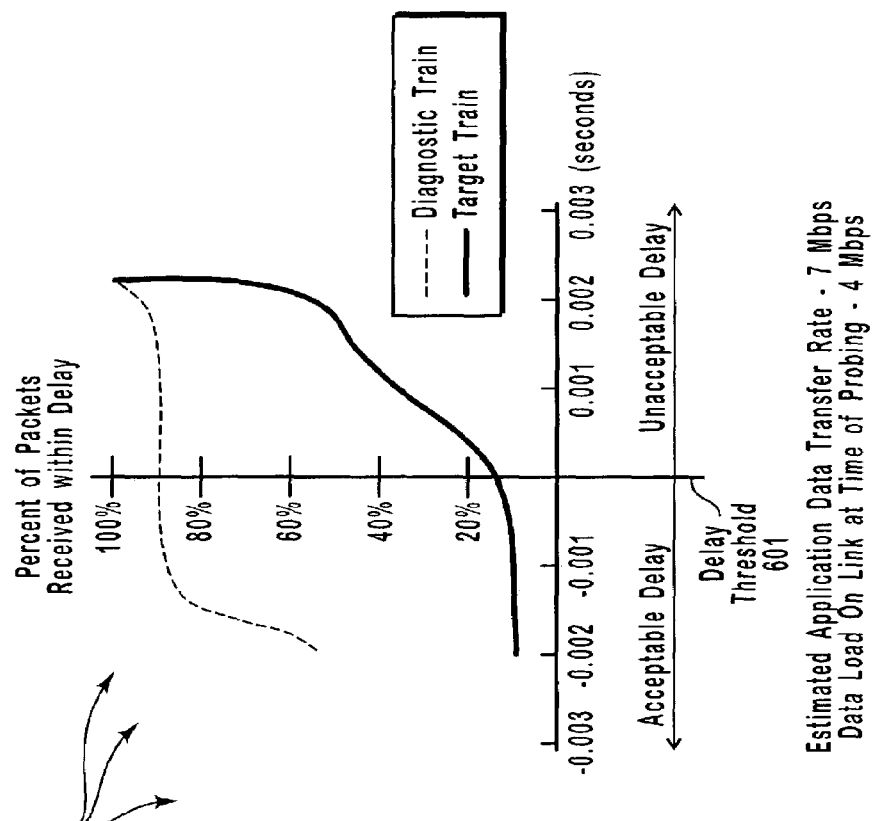
FIG. 6A illustrates an example graph of percentage of data packets received versus variance form a reception delay threshold indicating a decreased likelihood that a data stream will congest a probed network data path.
Figure 6B:
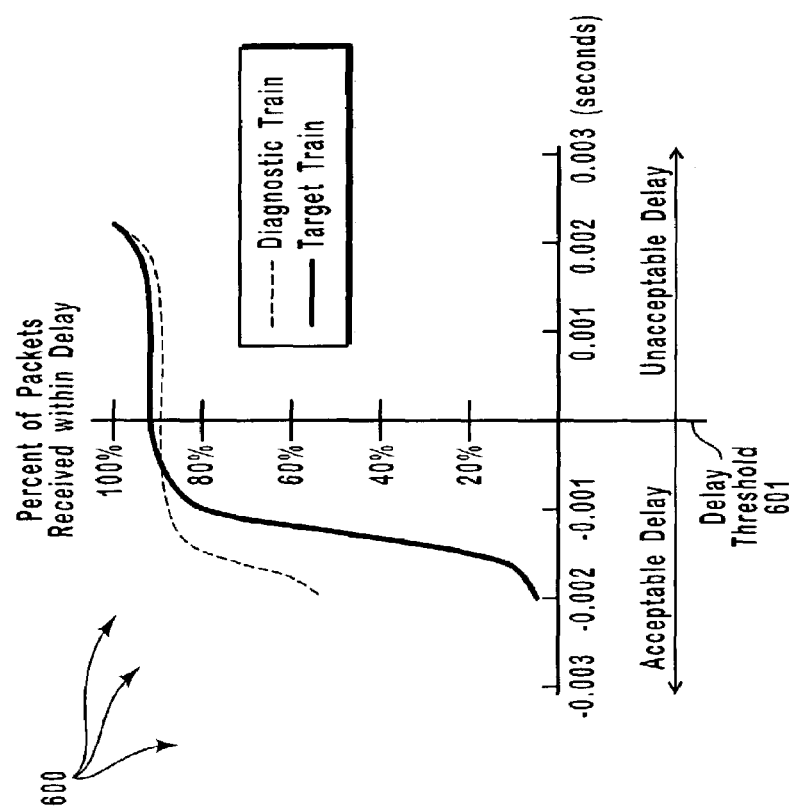
FIG. 6B illustrates an example graph of percentage of data packets received versus variance form a reception delay threshold indicating an increased likelihood that a data stream will congest a probe network data path.

In some embodiments, the likelihood of a data stream congesting a network data path is determined by comparing queuing delays associated with trains of data packets transmitted at varied data transfer rates. FIG. 4 illustrates an example flowchart of a method 400 for estimating a likelihood of congestion based on identified queuing delays. FIG. 5 illustrates an example graph 500 of queuing delay versus offered load on a 10 Mbps Ethernet link. FIG. 6A illustrates an example graph 600 of percentage of data packets received versus variance from a reception time delay threshold indicting a decreased likelihood that a data stream will cause a probed network data path to transition into a congested state. FIG. 6B illustrates an example graph 650 of percentage of data packets received versus variance from a reception time delay threshold indicting an increased likelihood that a data stream will cause a probed network data path to transition into a congested state. The method 400 will be described with respect to the computer systems depicted in network architecture 200 and the graphs 500, 600 and 650.

In the example graph 500, queuing delay is depicted on the vertical axis ("Y axis") and offered load is depicted on the horizontal axis ("X axis"). Graph 500 illustrates that at a particular offered load (e.g., 4 Mbps) a data packet traveling on an Ethernet link with a link capacity of 10 Mbps will experience a particular queuing delay (e.g., less than 2 milliseconds). As the offered load increases, the queuing delay remains relative constant until the offered load transitions into knee region 501. Then at some offered load within knee region 501 the queuing delay begins to increase drastically.

For example, the queuing delay increases more than five times between an offered load of 7 Mbps (queuing delay less than 2 milliseconds) and an offered load of 9 Mbps (queuing delay of approximately 10 milliseconds). Thus as graph 500 illustrates, increased queuing delay can occur even when the offered load is below link capacity. When queuing delay is increased, data packets remain on the Ethernet link for increased periods of time potentially causing the Ethernet link to transition into a congested state. Accordingly, the Ethernet link may not be suitable for data streams even if the offered load is below the link capacity. It should be understood that although graph 500 illustrates queuing delay versus offered load on a 10 Mbps Ethernet link, a wide variety of other types of data links, such as, for example, 100 Mbps Ethernet links and IEEE 802.11 links, can experience similar increases in queuing delay as offered loads increase.

Turning to FIG. 4, the method 400 includes an act of transmitting a train of diagnostic data packets (act 401). Act 401 can include a transmitting computer system transmitting a train of diagnostic packets onto a network data path at a specified fraction (e.g., one percent) of a bottleneck bandwidth value (e.g., as estimated by a packet-pair test). For example, probing module 204 can transmit a train of diagnostic data packets onto data path 291 at a fraction (e.g., $\frac{1}{100}^{th}$ or $\frac{1}{50}^{th}$) of the bottleneck bandwidth of data path 291. The specified fraction of the bottleneck bandwidth represents a diagnostic data rate with a significantly reduced likelihood of congesting the network data path or otherwise degrading data being transmitted on the network data path. For example, a diagnostic data rate of 50 Kilobits per second ("Kbps") can be used when transmitting a train of diagnostic data packets across a network data path having a bottleneck bandwidth of 5 Mbps. The transmitting computer system can include a time stamp in each diagnostic data packet indicating the time the diagnostic data packet was sent.

The method 400 includes an act of receiving at least some of the diagnostic data packets (act 404). Act 404 can include a receiving computer system receiving at least some of the diagnostic data packets included in a train of diagnostic data packets transmitted from the transmitting computer system to the receiving computer system. For example, probing module 234 can receive at least some of the diagnostic data packets in a train of diagnostic data packets sent from probing module 204.

The method 400 includes an act of identifying the number of delayed diagnostic data packets from among the received diagnostic data packets (act 405). For example, probing module can identify delayed diagnostic data packets from among diagnostic data packets received from probing module 204. A data packet is viewed as "delayed" when the calculated queuing delay for the data packet is greater than a specified reception time delay threshold. Queuing delay can be calculating according to Equation 3:

$$QD_i = \text{Transit\_Time\_For\_Packet}_i - \text{Minimum\_Tran\_Time\_Over\_All\_Recieved\_Packets}$$  Equation 3

Transit_Time_For_Packet$_i$ is a value representing the transit (or over-the-wire) time for a particular received data packet. Transit_Time_For_Packet$_i$ is equal to the difference of the time a data packet was received minus the time the data packet was transmitted. When a data packet is received, RTime_Pack is a value that can be used to represent the time of reception. The time a data packet was transmitted can be identified from a time stamp included in the data packet. TTime_Pack is a value that can be used to represent the time a data packet was transmitted. When data packets from a train of data packets are received, the time of transmission and time of reception for each received data packet is identified and appropriately represented. The transit time, (RTime_Pack-TTime_Pack), is calculated for each received data packet. Minimum_Tran_Time_Over_All_Received_Packets is a value representing the smallest transit time from among all the calculated transit times.

The values in Equation 3 can be combined according to the arithmetic operators in Equation 3 to calculate a $QD_i$ value representing the queuing delay for a particular data packet. Subtracting a Minimum_Tran_Time_Over_All_Received_Packets value normalizes the $QD_i$ values and compensates for differences in clock values at the transmitting and receiving side computer systems. Accordingly, even if transit times for data packets are inaccurate or negative due to clock inaccuracies, Equation 3 can still be utilized. Table 1 illustrates an example of possible transmission and reception times (as Hours:Minutes:Seconds) for eight data packets:

TABLE 1

| Data Packet # | Time of Transmission at Transmitting Computer | Time of Reception At Receiving Computer | Apparent Transit Time |
|---|---|---|---|
| 1 | 12:10:01.004 | 12:10:06.057 | 00:05.053 sec |
| 2 | 12:10:01.006 | 12:10:06.059 | 00:05.053 sec |
| 3 | 12:10:01.008 | 12:10:06.060 | 00:05.052 sec |
| 4 | 12:10:01.010 | 12:10:06.063 | 00:05.053 sec |
| 5 | 12:10:01.012 | 12:10:06.068 | 00:05.056 sec |
| 6 | 12:10:01.014 | 12:10:06.068 | 00:05.054 sec |
| 7 | 12:10:01.016 | 12:10:06.070 | 00:05.054 sec |
| 8 | 12:10:01.018 | 12:10:06.073 | 00:05.055 sec |

As shown in Table 1, data packet 3 is associated with a Minimum_Tran_Time_Over_All_Received_Packets value of 5.052 seconds for the eight data packets. The column for transit time is labeled "Apparent Transit Time" because clock inaccuracies may make the transit time appear much different than the actual transit time. A reception delay threshold can be virtually any threshold an administrator or user selects as appropriate. In some embodiments, a reception delay threshold is equal to a transmission time interval (e.g., between asynchronous sends). In Table 1, the transmission time interval is 2 milliseconds.

According to Equation 3, $QD_i$ for each data packet can be calculated by taking the difference of the packet's Apparent Transit Time minus 5.052. For example, the $QD_i$ for packet 7 would be 5.054 sec–5.052 sec, or 2 ms. Packet 7 would not be viewed as a delayed packet since a $QD_i$ of 2 milliseconds is less than or equal to the transmission time interval of 2 milliseconds. On the other hand, packet 5 would have a $QD_i$ of 4 milliseconds and would be viewed as a delayed packet since 4 milliseconds is greater that 2 milliseconds.

The method 400 includes an act of transmitting a train of target data packets (act 402.) Act 402 can include a transmitting computer system temporarily transmitting a train of target data packets onto the computer network data path at a requested data transfer rate (e.g., as requested by an application module). The train of target packets can be transmitted for a relatively short period of time to reduce the build up of capture effect. Thus, the requested data transfer rate can be simulated in a manner that has a reduced likelihood of degrading other data streams. The transmitting computer system can include a time stamp in each target data packet indicating the time the target packet was sent.

The method 400 includes an act of receiving at least some of the target data packets (act 406). Act 406 can include a receiving computer system receiving at least some of the data packets included in the train of target data packets that was sent from the transmitting computer system to the receiving computer system. For example, probing module 234 can receive at least some of the target data packets in a train of target data packets sent from probing module 204.

The method 400 includes an act of identifying the number of delayed target data packets from among the received target data packets (act 407). For example, probing module 234 can identify delayed target data packets from among target data packets received from probing module 204. Probing module 234 can identify delayed target data packets in accordance with Equation 3.

The method 400 includes an act of comparing the number of delayed target data packets to the number of delayed diagnostic data packets (act 408). Act 408 can include a receiving computer system comparing the number of delayed target data packets to the number of delayed diagnostic data packets to determine if the train of target data packets caused congestion on a network data path. For example, probing module 234 can compare a number of delayed target data packets sent from probing module 204 to a number of delayed diagnostic data packets sent from probing module 204.

When the number of delayed target data packets is within a specified delayed packets threshold of the number of delayed diagnostic data packets, there is decreased likelihood that delivery of the application data stream would cause the probed network data path to transition into a congested state. A delayed packets threshold can be a number of data packets or a percentage of data packets and can be varied to represent more conservative or less conservative estimations of an application data stream causing network congestion.

For example, when more conservative estimations that a data stream will not congest a network are desired, a smaller delayed packets threshold, such as, for example, 3% can be set. Accordingly, for a train of target data packets to indicate a decreased likelihood of network data path congestion, the number of target data packets received within a reception delay threshold could only be 3% less than the number of diagnostic data packets received within the reception delay threshold. On the other hand, when less conservative estimations that a data stream will not congest a network are desired, a larger delayed packets threshold, such as, for example, 12% can be set. Accordingly, for a train of target data packets to indicate a decreased likelihood of network data path congestion, the number of target data packets received within a reception delay threshold could only be 12% less than the number of diagnostic data packets received within the reception delay threshold.

Turning to FIG. 6A, example graph 600 illustrates the percentage of target data packets and diagnostic data packets received within a delay threshold 601 for a probed network data path. Data packets (both diagnostic and target) delayed less than reception delay threshold 601 are viewed as having an acceptable delay. Conversely, data packets delayed more than reception delay threshold 601 are viewed as having an unacceptable delay. In the example graph 600, percentage of received packets is depicted on the vertical axis ("Y axis") and time differential from reception delay threshold 601 is depicted on the horizontal axis ("X axis"). Example graph 600 depicts the results of actively probing a network data path (e.g., data path 291) having a data load of 4 Mbps to determine if a data stream having an estimated data transfer rate of 2 Mbps would cause the network data path to transition into a congested state.

The Y-intercept of the diagnostic train represents the percentage of diagnostic data packets received within reception delay threshold 601. As depicted, approximately ninety percent of the diagnostic data packets were received within an acceptable delay. The Y-intercept of the target train represents the percentage of target data packets received within reception delay threshold 601. As depicted, approximately ninety percent of the target data packets were received within an acceptable delay. As a similar percentage of target data packets and diagnostic data packets were received within an acceptable delay, the percentage of target data packets would probably be viewed as within a delayed packets threshold of the percentage of diagnostic data packets. Thus, example graph 600 indicates that a data stream at an application data transfer rate of 2 Mbps would probably not congest the probed network data path. Accordingly, transmission of the 2 Mbps data stream onto the probed network data path can be allowed.

When the number of delayed target data packets is not within a specified delayed packets threshold of the number of delayed diagnostic data packets, there is increased likelihood that delivery of the application data stream would cause the probed network data path to transition into a congested state. Turning to FIG. 6B, example graph 650 illustrates the percentage of target data packets and diagnostic data packets received within reception delay threshold 601 from a probed network data path. Data packets (both diagnostic and target) delayed less than reception delay threshold 601 are viewed as having an acceptable delay. Conversely, data packets delayed more than reception delay threshold 601 are viewed as having an unacceptable delay.

In the example graph 650, percentage of received packets is depicted on the vertical axis ("Y axis") and time differential from reception delay threshold 601 is depicted on the horizontal axis ("X axis"). Example graph 650 depicts the results of actively probing a network data path (e.g., data path 291) having a data load of 4 Mbps to determine if a data stream having an estimated data transfer rate of 7 Mbps would cause the network data path to transition into a congested state.

The Y-intercept of the diagnostic train represents the number of diagnostic data packets received within reception delay threshold 601. As depicted, approximately ninety percent of the diagnostic data packets were received within delay threshold 601. The Y-intercept of the target train represents the number of target data packets received within delay threshold 601. As depicted, approximately fifteen percent of the target data packets were received within delay threshold 601. As the percentage of target data packets and the percentage diagnostic data packets received within an acceptable delay vary significantly, the percentage of target data packets would probably not be viewed as within a delayed packets threshold of the percentage of diagnostic data packets. Thus, example graph 650 indicates that a data stream at an application data transfer rate of 7 Mbps would probably congest the probed network data path. Accordingly, transmission of the 7 Mbps data stream onto the probed network data path can be prevented. As a beneficial result, a data stream having an increased likelihood of congesting a network data path is prevented from being transmitted onto network data path.

Depending on the configuration of a network data path (e.g., having data links of 10 Mbps, 100 Mbps, etc.), a particular percentage of target data packets received within an acceptable delay (e.g., before reception delay threshold 601), when viewed alone, may not necessary provide a reliable indication of congestion. For example, on a 10 Mbps network data link, reception of 75% of target data packets within delay threshold can be viewed as a reception percentage that does not indicate congestion. On the other hand, on a 100 Mbps network data link, reception of 75% of target data packets within a delay threshold can be viewed as a reception percentage that does indicate congestion. However, there may be no way for a transmitting and/or a receiving side computer system to know the configuration of a network data path before a train of target data packets is transmitted. For example, a transmitting side and a receiving side computer system may be separated by one or more intermediate data links (including a bottleneck link).

As previously described, trains of diagnostic packets can be transmitted at a data rate having a significantly reduced likelihood of congesting a network data path. Accordingly, a train of diagnostic packets can be utilized to identify an acceptable threshold of delayed packets for a network data path when the network data path is probably not congested. Further, the acceptable threshold of delayed packets can be identified even when transmitting and receiving side computer systems have no prior information about the configuration of the network data path. As a result, there is no requirement that the transmitting and receiving side computer systems be aware of network data path configuration before determining if a data stream can be transmitted onto the network data path. Further, by comparing a percentage of delayed target data packets to an acceptable threshold of delayed packets (as opposed to making a determination based solely on the configuration of a network data path) more reliable determinations can be made.

The method 400 includes an act of sending results of the comparison (act 409). Act 409 can include the receiving computer system sending the results of a comparison of the queuing delays of target data packets compared to diagnostic data packets to the transmitting computer system. For example, probing module 234 can send the results of a comparison to probing module 204. The method 400 includes an act of receiving the results of a comparison (act 403). Act 403 can include the transmitting computer system receiving the results of a comparison of the queuing delays of target data packets compared to diagnostic data packets from the receiving computer system. For example, probing module 204 can receive results of a comparison from probing module 234. When results are appropriate, application module 202 can then transmit an application data stream at the requested application data rate to application 232.

In some embodiments, a train of intermediate diagnostic data packets is transmitted from the transmitting computer system to the receiving computer system after transmission of a train of diagnostic data packets. The train of intermediate diagnostic data packets is transmitted at an intermediate diagnostic data rate, which is greater than the diagnostic data rate but less than the requested application data rate. When a requested application data rate is relatively large compared to the diagnostic data rate, it may be advantageous to determine potential congestion at some intermediate diagnostic data rate between a diagnostic data rate and a requested application data rate. For example, it may be that an Available_Botttleneck_Bandwidth value for a network data path is 70 Mbps. Accordingly, a diagnostic data rate of 700 Kbps may be selected. When a requested application data transfer rate is 60 Mbps, it may be advantageous to determine potential congestion at an intermediate diagnostic data rate between 700 Kbps and 60 Mbps, such as, for example, at 20 or 30 Mbps.

Queuing delays for received intermediate diagnostic data packets are compared to queuing delays for received diagnostic packets. When the number of delayed intermediate diagnostic data packets is not within a specified delayed packets threshold of the number of delayed diagnostic data packets, there is increased likelihood that delivery of an data stream at the intermediate diagnostic data rate would cause the probed network data path to transition into a congested state. As a result, a data stream at the higher requested application data rate would probably also cause the probed network data path to transition into a congested state. Accordingly, active probing may terminate without actively probing at the requested application data transfer rate. As a beneficial result, transmission of a data stream with an increased likelihood of congesting a probed network data path is prevented form being transmitted onto the probed network data path.

On the other hand, when the number of delayed intermediate diagnostic data packets is within a specified delayed packets threshold of the number of delayed diagnostic data packets, there is decreased likelihood that delivery of a data stream at the intermediate diagnostic data rate would cause the probed network data path to transition into a congested state. Accordingly, active probing may continue at the requested application data transfer rate.

It may be that sequences of trains of data packets (diagnostic, intermediate diagnostic, or target) are transmitted to actively probe a network data path in order to increase the reliability of decisions with respect to potential network path congestion. Initially, a sequence of trains of diagnostic packets is transmitted to identify queuing delays associated with a data transfer rate that has a significantly reduced likelihood of congesting a network data path. Subsequently, and when appropriate, a sequence of trains of intermediate diagnostic data packets are transmitted to identify queuing delays associated with an intermediate diagnostic data transfer rate. Then, a sequence of trains of target data packets are transmitted to identify queuing delays associated with a requested application data transfer rate.

Each train of data packets in a sequence can be separated by a probing train interval. A probing train interval can be selected to reduce capture effects on a probed network data path. For example, trains of ten data packets transmitted at 1 millisecond probing data packet intervals (i.e., having a total transmission time of 10 milliseconds) can be separated by a probing train interval of 90 ms. Thus, a 100 millisecond interval separates the start of transmission for successive trains in a sequence of data packet trains. This effectively reduces the load used to probe a network data path to 10% of a requested application data rate.

A network administrator or user can select the number of trains in a sequence of trains according to desired reliability and efficiency. When more reliability is desired, the number of trains in a sequence can be increased thereby providing additional samples for the calculation of queuing delays. On the other hand, when more efficiency is desired, the number of trains in a sequence can be reduced thereby reducing the time for probing a network data path to complete.

In some embodiments, a probing module (e.g., probing module 204, 224, or 234) provides a user-interface at a computer system such that a network administrator or user can select and/or enter desirable values for parameters described herein. It may be that a user-interface provides lists of parameter values that can be selected by an network administrator or user with an input device. Similarly it may be that a user-interface provides labeled fields where a network administrator or user can enter values with an input device. For example, through the user-interface a network administrator or user can select or enter a desirable Acceptable_Loading value for a transmitting and/or receiving side data link and a desirable specified bottleneck loading to limit the bandwidth available to data streams. Likewise, a network administrator or user can select or enter parameters for configuring trains of data packets and sequences of trains of data packets for actively probing a network data path.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention of claimed is:

1. In a transmitting computer system that is network connectable to a receiving computer system via a computer network data path, the computer network data path including at least a transmitting side data link and a receiving side data link, a method for determining that an application data stream can be delivered from the transmitting computer system to the receiving computer system without congesting any of the data links included in the computer network data path, the method comprising:

an act of receiving a requested application data transfer rate from an application that requests delivery of the application data stream from the transmitting computer system to the receiving computer system, the requested application data transfer rate representing an estimation of the bandwidth that will be consumed during delivery of the application data stream;

an act of passively detecting a transmission side data load on the transmission side data link;

an act of calculating that, based on the transmission side data load, the available bandwidth capacity on the transmitting side data link is sufficient to support a stream of data at the requested application data transfer rate;

an act of transmitting a first packet-pair data packet onto the computer network data path for delivery to the receiving computer system or an intermediate computer system;

an act of, subsequent to transmitting the first packet-pair data packet, transmitting a corresponding second packet-pair data packet onto the computer network data for delivery to the receiving computer system or the intermediate computer system, the second packet-pair data packet being similar in size to the first packet-pair data packet;

an act of receiving an indication that the available bandwidth capacity on the bottleneck data link of the computer network data path is sufficient to receive a stream of data at the requested application data transfer rate;

an act of identifying transmission parameters for configuring trains of probing data packets to simulate transmitting the application data stream at the requested application data transfer rate;

an act of temporarily transmitting a train of probing data packets in accordance with the identified transmission parameters to simulate transmission of the application data stream onto the computer network data path; and an act of receiving an indication that the train of data probing packets did not cause any of the data links of the computer network data path to transition into a congested state.

2. The method as recited in claim 1, wherein the act of receiving an application data transfer rate from an application, the requested application data transfer rate representing an estimation of the bandwidth will be consumed during delivery of the application data stream, comprises an act of application data transfer rate estimating the bandwidth will be consumed during delivery of a Universal Datagram Protocol data stream.

3. The method as recited in claim 1, wherein the act of calculating that the available bandwidth capacity on the transmitting side data link is sufficient to support a stream of data at the application requested data transfer rate comprises an act of calculating the available bandwidth capacity on the transmitting side data link based on a user-selected acceptable loading value.

4. The method as recited in claim 1, wherein the act of identifying transmission parameters for configuring trains of probing data packets comprises an act of identifying user-selected transmission parameters entered at a user-interface.

5. The method as recited in claim 1, further comprising:
an act of sending an instruction to a receiving side computer system to passively detect receiving side data load.

6. The method as recited in claim 1, further comprising:
an act of receiving an indication that the available bandwidth capacity on the receiving side data link is sufficient to support a stream of data at the requested application data transfer rate.

7. The method as recited in claim 1, further comprising:
an act of transmitting the application data stream onto the computer network data path at the requested application data transfer rate.

8. The method as recited in claim 1, wherein the transmitting side data link and the receiving side data link are the same data link.

9. In a transmitting computer system that is network connectable to a receiving computer system via a computer network data path, the computer network data path including at least a transmitting side data link and a receiving side data link, a method for determining that an application data stream can be delivered from the transmitting computer system to the receiving computer system without congesting any of the data links included in the computer network data path, the method comprising:

an act of receiving a requested application data transfer rate from an application that requests delivery of the application data stream from the transmitting computer system to the receiving computer system, the requested application data transfer rate representing an estimation of the bandwidth that will be consumed during delivery of the application data stream;

a step for performing promiscuous mode measurements to determine that the transmitting side data link has sufficient available bandwidth to receive the application data stream;

a step for initiating a packet-pair test to determine if the bottleneck data link of the computer network data path has sufficient available bandwidth capacity to receive the application data stream;

an act of receiving an indication that the available bandwidth capacity on the bottleneck data link is sufficient to receive a stream of data at the requested application data transfer rate;

a step for actively probing the computer network data path with a train of probing data packets to determine if the computer network data path will transition into a congested state when the application data stream is delivered onto the computer network data path; and an act of receiving an indication that the train of probing data packets did not cause any of the data links of the computer network data path to transition into a congested state.

10. In a receiving computer system that is network connectable to a transmitting computer system via a computer network data path, the computer network data path including at least a receiving side data link and a transmitting side data link, a method for determining that an application data stream can be delivered from the transmitting computer system to the receiving computer system without congesting any of the data links included in the computer network data path, the method comprising:

an act of passively detecting a receiving side data load on the receiving side data link;

an act of calculating, based on the receiving side data load, the available bandwidth capacity on the receiving side data link;

an act of indicating the available bandwidth capacity on the receiving side data link to the transmitting computer system;

an act of receiving a first packet-pair data packet from the computer network data path at a first reception time;

an act of receiving a second packet-pair data packet from the computer network data path at a second reception time;

an act of calculating, based at least on the difference between the first reception time and the second reception time, the available bandwidth capacity on the bottleneck data link of the computer network data path;

an act of indicating the available bandwidth capacity on the bottleneck data link to the transmitting computer system;

an act of receiving at least some of the probing data packets in a train of probing data packets the transmitting computer system transmitted onto the computer network data path to simulate an application data stream at an application data transfer rate;

an act of calculating that the train of probing data packets did not cause any of the data links of the computer network data path to transition into a congested state; and an act of indicating to the transmitting computer system that the train of probing data packets did not cause any of the data links of the computer network data path to transition into a congested state.

11. The method as recited in claim 10, wherein the act of calculating, based on the receiving side data load, the available bandwidth capacity on the receiving side data link comprises an act of calculating the available bandwidth capacity on the receiving side data link based on a user-selected acceptable loading value.

12. The method as recited in claim 10, wherein the act of calculating, based at least on the difference between the first reception time and the second reception time, the available bandwidth capacity on the bottleneck data link comprises an act of calculating the bottleneck bandwidth based on the reception times of a plurality of packet-pair data packets included in a train of packet-pair data packets transmitted in accordance with a packet-pair algorithm.

13. The method as recited in claim 10, further comprising:
an act of receiving an instruction from a transmitting side computer system to passively detect receiving side data load.

14. The method as recited in claim 10, further comprising:
an act of receiving the application data stream from the computer network data path at the requested application data transfer rate.

15. The method as recited in claim 10, wherein the transmitting side data link and the receiving side data link are the same data link.

16. In a receiving computer system that is network connectable to a transmitting computer system via a computer network data path, the computer network data path including at least a receiving side data link and a transmitting side data link, a method for determining that an application data stream can be delivered from the transmitting computer system to the receiving computer system without congesting any of the data links included in the computer network data path, the method comprising:

a step for participating in promiscuous mode measurements to determine the available bandwidth capacity on the receiving side data link;

an act of indicating the available bandwidth capacity on the receiving side data link to the transmitting computer system;

a step for participating in a packet-pair test to determine the available bandwidth capacity on the bottleneck data link of the computer network data path;

an act of indicating the available bandwidth capacity on the bottleneck data link to the transmitting computer system;

a step for participating in active probing of the computer network data path to determine that delivering the application data stream will not cause any of the data links of the computer network data path to transition into a congested state; and an act of indicating to the transmitting computer system that the train of probing data packets did not cause any of the data links of the computer network data path to transition into a congested state.

17. In a transmitting computer system that is network connectable to a receiving computer system via a computer network data path, the computer network data path including at least a transmitting side data link and a receiving side data link, the computer network data path having a bottleneck bandwidth representing the bandwidth of the bottleneck link of the computer network data path, a method for actively probing the computer network data path to determine if delivering an application data stream onto the computer network data path at a requested data transfer rate would cause the any of the data links included in the computer network data path to transition into a congested state, the method comprising:

an act of transmitting a train of diagnostic data packets onto the computer network data path at a specified fraction of the bottleneck bandwidth, the specified fraction of the bottleneck bandwidth representing a diagnostic data transfer rate with a significantly reduced likelihood of degrading other data streams;

an act of temporarily transmitting a train of target data packets onto the computer network data path at the requested data transfer rate such that transmission of the application data stream can be simulated in a manner that has a reduced likelihood of degrading other data streams; and an act of receiving the results of a comparison that indicates whether or not the train of target data packets caused congestion on any of the data links included in the computer network data path.

18. The method as recited in claim 17, wherein the act of transmitting a train of diagnostic data packets onto the computer network data path at a specified fraction of the bottleneck bandwidth comprises an act of transmitting a train of diagnostic data packets that is one of plurality of trains of diagnostic data packets included in a sequence of trains of diagnostic data packets, the transmission of each train of diagnostic data packets in the plurality of trains of diagnostics data packets being separating by a probing train interval.

19. The method as recited in claim 17, wherein the act of temporarily transmitting a train of target data packets onto the computer network data path at the requested application data transfer rate comprises an act of transmitting a train of target data packets that is one of plurality of trains of target data packets included in a sequence of trains of target data packets, the transmission of each train of target data packets in the plurality of trains of target data packets being separating by a probing train interval.

20. The method as recited in claim 17, further comprising:
an act of calculating the bottleneck bandwidth from a packet-pair test.

21. The method as recited in claim 17, further comprising:
an act of determining that, based on the bottleneck bandwidth and the requested application data transfer rate, a train of intermediate diagnostic data packets should be transmitted to the receiving computer system at an intermediate diagnostic data rate, the intermediate diagnostic data rate being greater than the diagnostics data rate and less than the requested application data transfer rate.

22. The method as recited claim 21, further comprising:
an act of transmitting a train of intermediate diagnostics data packets at the intermediate diagnostic data rate.

23. The method as recited claim 17, further comprising:
an act of receiving user-selected transmission parameters for configuring the trains of data packets from a user-interface at the transmitting computer system.

24. In a receiving computer system that is network connectable to a transmitting computer system via a computer network data path, the computer network data path including at least a transmitting side data link and a receiving side data link, the computer network data path having a bottleneck bandwidth representing the bandwidth of the bottleneck link of the computer network data path, a method for actively probing the computer network data path to determine if delivering an application data stream onto the computer network data path at a requested data transfer rate would cause the any of the data links included in the computer network data path to transition into a congested state, the method comprising:
an act of receiving at least some of the diagnostic data packets included in a train of diagnostic data packets that was sent from the transmitting computer system to the receiving computer system, the diagnostic packets being received at a fraction of the bottleneck bandwidth so as to significantly reduce the likelihood of degrading other data streams;
an act of identifying the number of delayed diagnostic data packets from among the received diagnostics packets;
an act of receiving at least some of the target packets included in a train of target data packets that was temporarily sent from the transmitting computer system to the receiving computer to simulate transmission of the application data stream in a manner that has a reduced likelihood of degrading other data streams;
an act of identifying the number of delayed target data packets from among the received target data packets; and
an act of comparing the number of delayed target data packets to the number of delayed diagnostic data packets to determine if the train of target data packets caused congestion on any of the data links of the computer network data path.

25. The method as recited in claim 24, wherein the an act of receiving at least some of the diagnostic data packets included in a train of diagnostic data packets that was sent from the transmitting computer system to the receiving computer system, comprises an act of receiving diagnostic data packets from a train of diagnostic data packets that is one of a plurality of trains of diagnostic data packets included in a sequence of trains of diagnostic data packets.

26. The method as recited in claim 24, wherein the act of identifying the number of delayed diagnostic data packets from among the received diagnostic data packets comprises an act of identifying diagnostic data packets that were not received within a reception delay threshold.

27. The method as recited in claim 24, wherein the an act of receiving at least some of the target data packets included in a train of target packets that was temporarily sent from the transmitting computer system to the receiving computer system, comprises an act of receiving target data packets from a train of target data packets that is one of a plurality of trains of target data packets included in a sequence of trains of target data packets.

28. The method as recited in claim 24, wherein the act of identifying the number of delayed target data packets from among the received target data packets comprises an act of identifying target data packets that were not received within a reception delay threshold.

29. The method as recited in claim 24, wherein the act of comparing the number of delayed target data packets to the number of delayed diagnostic data packets comprises an act of comparing the percentage of target data packets received within a reception delay to the number of diagnostics data packets received with the reception delay.

30. The method as recited in claim 24, further comprising:
an act of receiving at least some of the intermediate diagnostic data packets included a train of intermediate diagnostic data packets that was sent from the transmitting computer system to the receiving computer at an intermediate diagnostic data transfer rate, the intermediate diagnostic data transfer rate being greater than the fraction of bottleneck bandwidth and less than an application data transfer rate of the application data stream.

31. A computer program product for use in a transmitting computer system that is network connectable to a receiving computer system via a computer network data path, the computer network data path including at least a transmitting side data link and a receiving side data link, the computer program product comprising one or more computer-readable media having computer executable instructions stored thereon, which when executed by a computer, implement a method for determining that an application data stream can be delivered from the transmitting computer system to the receiving computer system without congesting any of the data links included in the computer network data path, the computer program product comprising:
computer-executable instructions for receiving a requested application data transfer rate from an application that requests delivery of the application data stream from the transmitting computer system to the receiving computer system, the requested application data transfer rate representing an estimation of the bandwidth that will be consumed during delivery of the application data stream;
computer-executable instructions for passively detecting a transmission side data load on the transmission side data link;
computer-executable instructions for calculating that, based on the transmission side data load, the available bandwidth capacity on the transmitting side data link is sufficient to support a stream of data at the requested application data transfer rate;
computer-executable instructions for transmitting a first packet-pair data packet onto the computer network data path for delivery to the receiving computer system or an intermediate computer system;
computer-executable instructions for, subsequent to transmitting the first packet-pair data packet, transmitting a corresponding second packet-pair data packet onto the computer network data for delivery to the receiving computer system or the intermediate computer system, the second packet-pair data packet being similar in size to the first packet-pair data packet;
computer-executable instructions for receiving an indication that the available bandwidth capacity on the bottleneck data link of the computer network data path is sufficient to receive a stream of data at the requested application data transfer rate;

computer-executable instructions for identifying transmission parameters for configuring trains of probing data packets to simulate transmitting the application data stream at the requested application data transfer rate;

computer-executable instructions for temporarily transmitting a train of probing data packets in accordance with the identified transmission parameters to simulate transmission of the application data stream onto the computer network data path; and computer-executable instructions for receiving an indication that the train of data probing packets did not cause any of the data links of the computer network data path to transition into a congested state.

32. The method as recited in claim 31, wherein the one or more computer-readable media comprise physical storage media.

33. A computer program product for use in a receiving computer system that is network connectable to a transmitting computer system via a computer network data path, the computer network data path including at least a receiving side data link and a transmitting side data link, the computer program product comprising one or more computer-readable media having computer executable instructions stored thereon, which when executed by a computer, implement a method for determining that an application data stream can be delivered from the transmitting computer system to the receiving computer system without congesting any of the data links included in the computer network data path, the computer program product comprising:

computer-executable instructions for passively detecting a receiving side data load on the receiving side data link;

computer-executable instructions for calculating, based on the receiving side data load, the available bandwidth capacity on the receiving side data link;

computer-executable instructions for indicating the available bandwidth capacity on the receiving side data link to the transmitting computer system;

computer-executable instructions for receiving a first packet-pair data packet from the computer network data path at a first reception time;

computer-executable instructions for receiving a second packet-pair data packet from the computer network data path at a second reception time;

computer-executable instructions for calculating, based at least on the difference between the first reception time and the second reception time, the available bandwidth capacity on the bottleneck data link of the computer network data path;

computer-executable instructions for indicating the available bandwidth capacity on the bottleneck data link to the transmitting computer system;

computer-executable instructions for receiving at least some of the probing data packets in a train of probing data packets the transmitting computer system transmitted onto the computer network data path to simulate an application data stream at an application data transfer rate;

computer-executable instructions for calculating that the train of probing data packets did not cause any of the data links of the computer network data path to transition into a congested state; and computer-executable instructions for indicating to the transmitting computer system that the train of probing data packets did not cause any of the data links of the computer network data path to transition into a congested state.

34. The method as recited in claim 33, wherein the one or more computer-readable media comprise physical storage media.

35. A computer system configured to actively probe a computer network data path to determine if delivering an application data stream onto the computer network data path would cause the network data path to transition into a congestion state, comprising:

one or more processing units; and one or more computer readable media having stored thereon a transmitting side probing module, the transmitting side probing module being configured, when executed by a computer, to:

transmit a train of diagnostic data packets onto the computer network data path at a specified fraction of the bottleneck bandwidth, the specified fraction of the bottleneck bandwidth representing a diagnostic data transfer rate with a significantly reduced likelihood of degrading other data streams;

temporarily transmit a train of target data packets onto the computer network data path at a requested data transfer rate such that transmission of the application data stream can be simulated in a manner that has a reduced likelihood of degrading other data streams; and receive the results of a comparison that indicates whether or not the train of target data packets caused congestion on any of the data links included in the computer network data path.

36. A computer system configured to actively probe a computer network data path to determine if delivering an application data stream onto the computer network data path would cause the network data path to transition into a congestion state, comprising:

one or more processing units; and one or more computer readable media having stored thereon a receiving side probing module, the receiving side probing module being configured, when executed by a computer, to:

receive at least some of the diagnostic data packets included in a train of diagnostic data packets that was sent from the transmitting computer system to the receiving computer system, the diagnostic packets being received at a fraction of the bottleneck bandwidth so as to significantly reduce the likelihood of degrading other data streams;

identify the number of delayed diagnostic data packets from among the received diagnostics packets;

receive at least some of the target packets included in a train of target data packets that was temporarily sent from the transmitting computer system to the receiving computer to simulate transmission of the application data stream in a manner that has a reduced likelihood of degrading other data streams;

identify the number of delayed target data packets from among the received target data packets; and comparing the number of delayed target data packets to the number of delayed diagnostic data packets to determine if the train of target data packets caused congestion on any of the data links of the computer network data path.

* * * * *